US012423831B2

United States Patent
Katakol et al.

(10) Patent No.: US 12,423,831 B2
(45) Date of Patent: Sep. 23, 2025

(54) BACKGROUND SEPARATION FOR GUIDED GENERATIVE MODELS

(71) Applicant: ADOBE INC., San Jose, CA (US)

(72) Inventors: Sudeep Katakol, San Francisco, CA (US); Siddharth Iyer, San Francisco, CA (US); Aliakbar Darabi, Newcastle, WA (US)

(73) Assignee: ADOBE INC., San Jose, CA (US)

( * ) Notice: Subject to any disclaimer, the term of this patent is extended or adjusted under 35 U.S.C. 154(b) by 175 days.

(21) Appl. No.: 18/500,263

(22) Filed: Nov. 2, 2023

(65) Prior Publication Data

US 2024/0338829 A1   Oct. 10, 2024

Related U.S. Application Data

(60) Provisional application No. 63/495,194, filed on Apr. 10, 2023.

(51) Int. Cl.
*G06T 7/194* (2017.01)
*G06T 7/11* (2017.01)
*G06T 11/60* (2006.01)

(52) U.S. Cl.
CPC ............ *G06T 7/194* (2017.01); *G06T 7/11* (2017.01); *G06T 11/60* (2013.01); *G06T 2207/10024* (2013.01); *G06T 2207/20081* (2013.01); *G06T 2207/20084* (2013.01); *G06T 2207/20212* (2013.01)

(58) Field of Classification Search
CPC .......... G06T 11/60; G06T 2207/20081; G06T 2207/20084; G06T 2207/20212
See application file for complete search history.

(56) References Cited

U.S. PATENT DOCUMENTS

| | | | |
|---|---|---|---|
| 12,205,207 B2 | 1/2025 | Smetanin et al. | |
| 2020/0364913 A1 | 11/2020 | Bradski | |
| 2022/0414949 A1* | 12/2022 | Guan | G06T 7/11 |
| 2023/0135978 A1 | 5/2023 | Price et al. | |
| 2024/0127510 A1 | 4/2024 | Darabi et al. | |

OTHER PUBLICATIONS

Combined Search and Examination Report in related United Kingdom Patent Application No. GB2407653.1, 5 pages.
Saharia, et al., "Photorealistic Text-to-Image Diffusion Models with Deep Language Understanding", Advances in Neural Information Processing Systems, 35, 2022, pp. 36479-36494.
(Continued)

*Primary Examiner* — Priyank J Shah
(74) *Attorney, Agent, or Firm* — F. CHAU & ASSOCIATES, LLC

(57) ABSTRACT

Embodiments of the present disclosure include obtaining an input image and an approximate mask that approximately indicates a foreground region of the input image. Some embodiments generate an unconditional mask of the foreground region based on the input image. A conditional mask of the foreground region is generated based on the input image and the approximate mask. Then, an output image is generated based on the unconditional mask and the conditional mask. In some cases, the output image includes the foreground region of the input image.

20 Claims, 14 Drawing Sheets

(56) References Cited

OTHER PUBLICATIONS

Ramesh, et al., "Hierarchical Text-Conditional Image Generation with CLIP Latents", arXiv preprint arXiv:2204.06125v1 [cs.CV] Apr. 13, 2022, 27 pages.
Rombach, et al., "High-Resolution Image Synthesis with Latent Diffusion Models", In Proceedings of the IEEE/CVF conference on computer vision and pattern recognition, (2022), (pp. 10684-10695).
Meng, et al., "Sdedit: Guided Image Synthesis and Editing With Stochastic Differential Equations", arXiv preprint arXiv:2108.01073v2 [cs.CV] Jan. 5, 2022, 33 pages.
Balaji, et al., "eDiff-I: Text-to-Image Diffusion Models with an Ensemble of Expert Denoisers", arXiv preprint arXiv:2211.01324v5 [cs.CV] Mar. 14, 2023, 24 pages.
Dehouche, et al., "What's in a Text-to-Image Prompt? The Potential of Stable Diffusion in Visual Arts Education", 2023, arXiv, p. 1-11, https://doi.org/10.48550/arXiv.2301.01902 (Year: 2023).
Ma, et al., "Text Style Transfer With Decorative Elements", 2021, 2021 IEEE 4th International Conference on Multimedia Information Processing and Retrieval (MIPR), p. 330-336, https://doi.org/10.1145/3544903.3544906 (Year: 2021).
Xie, et al., "SmartBrush: Text and Shape Guided Object Inpainting with Diffusion Model", 2022, arXiv, p. 1-10, https://doi.org/10.48550/arXiv.2212.05034 (Year: 2022).
Office Action dated Jun. 2, 2025 in related U.S. Appl. No. 18/479,379.

\* cited by examiner

BACKGROUND SEPARATION FOR GUIDED GENERATIVE MODELS

CROSS-REFERENCE TO RELATED APPLICATION

This application claims benefit under 35 U.S.C. § 119 to U.S. Provisional Application No. 63/495,194, filed on Apr. 10, 2023, in the United States Patent and Trademark Office, the disclosure of which is incorporated by reference herein in its entirety.

BACKGROUND

The following relates generally to image processing, and more specifically to image background separation using machine learning. Image processing refers to the use of a computer to edit a digital image using an algorithm or a processing network. Recently, machine learning models have been used in advanced image processing techniques. Among these machine learning models, diffusion models and other generative models such as generative adversarial networks (GANs) have been used for various tasks including generating images with perceptual metrics, generating images in conditional settings, image inpainting, and image manipulation.

Image generation, a subfield of image processing, includes the use of machine learning models to synthesize images. Machine learning models can be used for various image generation tasks including image super-resolution, generation of images with perceptual metrics, conditional generation (e.g., generation based on text guidance), image inpainting, and image manipulation. For example, diffusion models are trained to take random noise as input and generate unseen images with features similar to the training data.

SUMMARY

The present disclosure describes systems and methods for image processing. Embodiments of the present disclosure comprise an image processing apparatus configured to separate the foreground (e.g., a region including one or more characters) from the background of an image via masking. In some cases, an image generation model generates characters following a specified font style. The font style is represented by a font mask (a binary image depicting the character) that guides the generation of the character. Since the character may not follow the boundary specified by the font style, the image processing apparatus overlays the character seamlessly into any background by precisely identifying the foreground region. In some examples, the image processing apparatus generates a combined foreground mask that is based on a combination of a conditional mask and an unconditional mask. The conditional mask is based on the font mask (e.g., an approximate mask indicates a foreground region of the input image) and an input image. In some examples, the combined foreground mask also incorporates a distance transformation map and a color map.

A method, apparatus, and non-transitory computer readable medium for image processing are described. One or more embodiments of the method, apparatus, and non-transitory computer readable medium include obtaining an input image and an approximate mask that approximately indicates a foreground region of the input image; generating, by an unconditional mask network, an unconditional mask of the foreground region based on the input image; generating, by a conditional mask network, a conditional mask of the foreground region based on the input image and the approximate mask; and generating an output image including the foreground region of the input image based on the unconditional mask and the conditional mask.

A method, apparatus, and non-transitory computer readable medium for image processing are described. One or more embodiments of the method, apparatus, and non-transitory computer readable medium include initializing an unconditional mask network and a conditional mask network; receiving training data including an input image, an approximate mask indicating a foreground region of the input image, and a ground-truth mask; training, using the training data, the unconditional mask network to generate an unconditional mask of the foreground region based on the input image; and training, using the training data, the conditional mask network to generate a conditional mask of the foreground region based on the input image and the approximate mask.

An apparatus and method for image processing are described. One or more embodiments of the apparatus and method include at least one processor; at least one memory including instructions executable by the at least one processor; a user interface comprising parameters stored in the at least one memory and configured to obtain an input image and an approximate mask that approximately indicates a foreground region of the input image; an unconditional mask network comprising parameters stored in the at least one memory and configured to generate an unconditional mask of the foreground region based on the input image; and a conditional mask network comprising parameters stored in the at least one memory and configured to generate a conditional mask of the foreground region based on the input image and the approximate mask.

DETAILED DESCRIPTION

Figure 1:
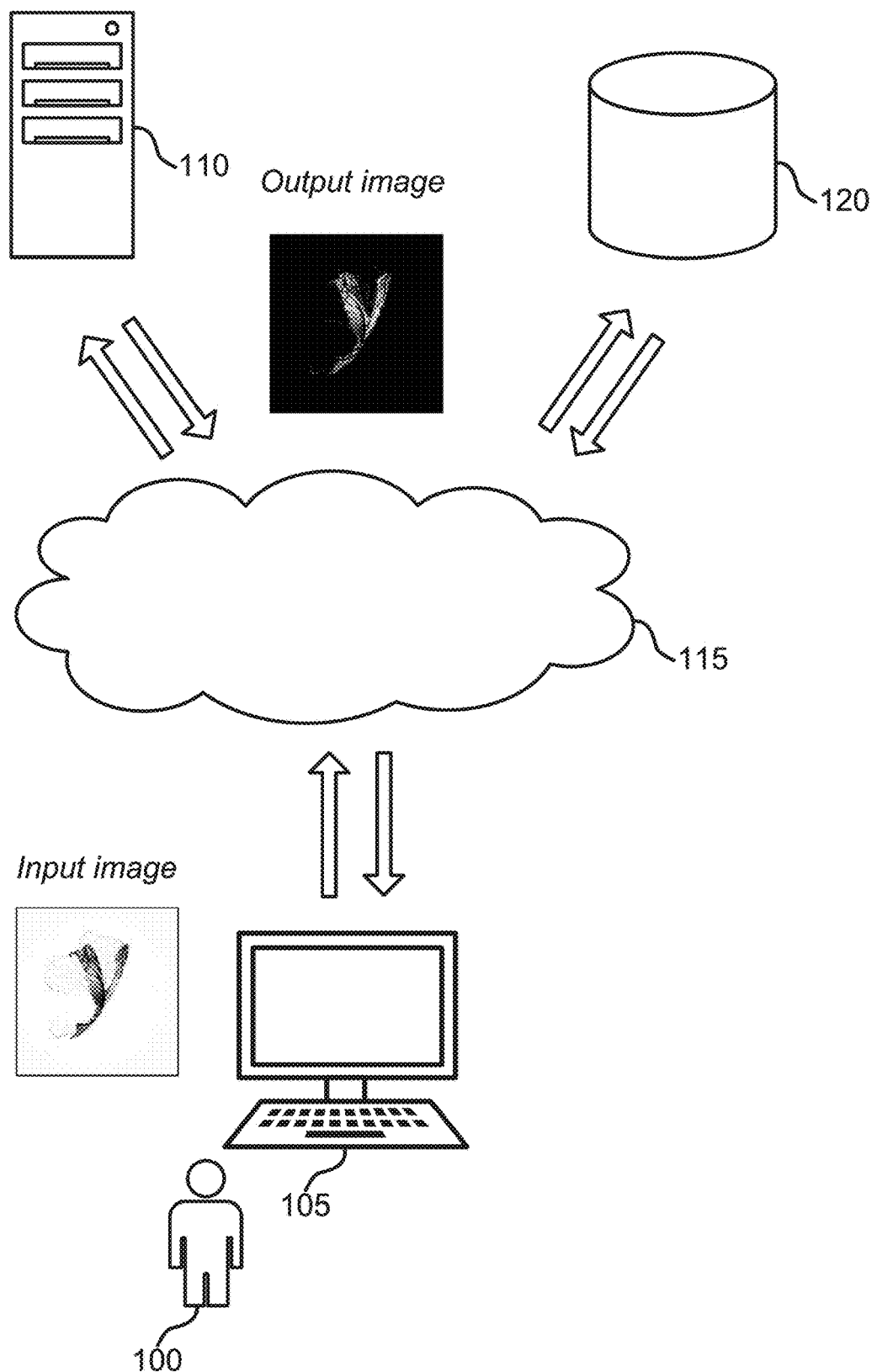
FIG. 1 shows an example of an image processing system according to aspects of the present disclosure.

The present disclosure describes systems and methods for image processing. Embodiments of the present disclosure comprise an image processing apparatus configured to separate the foreground (e.g., a region including one or more characters) from the background of an image via masking. In some cases, an image generation model generates characters following a specified font style. The font style is represented by a font mask (a binary image depicting the character) that guides the generation of the character. Since the character may not follow the boundary specified by the font style, the image processing apparatus overlays the character seamlessly into any background by precisely identifying the foreground region. In some examples, the image processing apparatus generates a combined foreground mask that is based on a combination of a conditional mask and an unconditional mask. The conditional mask is based on the font mask (e.g., an approximate mask indicates a foreground region of the input image) and an input image. In some examples, the combined foreground mask also incorporates a distance transformation map and a color map.

Recently, users have used software applications to modify attributes related to text. For example, in a word editing application, users can change attributes such as font and text color. Generative models produce text effects when combined with techniques like SDEdit and in-painting. Some methods generate characters in a style specified by a font style. The font style defines a font mask (a binary image depicting the character) that may guide the generation of the character. However, these generated images do not necessarily follow the boundary specified by the font mask. Naively placing a set of characters next to each other would lead to unsatisfactory results, e.g., overlapping boundaries, inconsistent edges. To overlay the character seamlessly into a target background, there is a need to separate the character (the foreground region) from the background.

In the field of image processing, background separation involves separating the foreground region of a generated image (as input) from the background region for further editing. Specifically, background separation task involves disentangling foreground elements from background, such as an object or a character located in the foreground region.

Conventional models struggle to separate foreground from background of an image due to insufficient masking methods. Some methods result in poor quality generations with "cut-out" like effects. Content creators have to manually edit the input image to "smooth out" the boundary of an image to match with other characters. The editing process is time consuming and not friendly to inexperienced editors.

Embodiments of the present disclosure include an improved image processing apparatus that generates more accurate foreground masks. For example, foreground masks generated by the improved image processing apparatus may be more appropriate for use with characters having a defined shape such as text characters. This enables users to generate text characters with synthetically generated textures that can be separated from the background (e.g., to place the text on another background).

Some embodiments of the disclosure are configured to receive an input image and an approximate mask via a user interface and generate an output image including the foreground region of the input image. The image processing apparatus combines an unconditional mask and a conditional mask to obtain a combined and refined foreground mask for background separation. In some examples, a distance transformation map and a color distance map are also incorporated into the combined foreground mask. Hence, the combined foreground mask imposes a precise foreground probability mask representing the foreground region of the input image.

In some embodiments, an unconditional mask network generates the unconditional mask of the foreground region based solely on an input image. The unconditional mask includes a larger region than the foreground region of the input image and imposes less precise estimates near the boundary of the foreground region. Additionally, a conditional mask network generates the conditional mask of the foreground region based on both the input image and the approximate mask. This way, the approximate mask is refined to obtain more precise estimates of the boundary of the foreground region. In some examples, the approximate mask is a font mask representing the font style followed by the characters in the input image. The approximate mask is an approximation of the foreground region of the input image.

In some examples, the image processing apparatus computes a distance transformation map (i.e., an additional estimate of foreground probability mask via distance) by calculating a distance transform using the font mask. Additionally, the image processing apparatus generates a color map (i.e., an addition estimate of foreground probability mask via color) by computing the ratio of the distance to the average of the pixel values inside the font mask versus outside the font mask.

Embodiments of the present disclosure make use of multiple probability masks from various sources, via a mask combination component, to generate a precise mask prediction for the foreground region. The image processing apparatus based on the present disclosure uniquely combines an unconditional mask, a conditional mask, a distance transformation map, and a color distance map to generate a combined foreground mask. An island removal operation is then applied to remove small objects that lie outside the region defined by the font mask. The combined and refined foreground mask precisely wraps around the boundaries of the foreground region of the input image.

In some examples, a mask or transparency can be generated after the style is applied to the glyph. Since the generated image may not conform to the precise boundaries of the initial text font, it can be useful to determine the boundaries of the foreground after generation. This can be useful to enable a user to apply the text to another background.

To obtain the mask or transparency of the foreground text including the text effects, a combination of methods may be applied. For example, a subject selection method, an object selection method, or a color-based selection method may be used to identify and differentiate foreground and background pixels. In some cases, a single boundary selection method is used, but in some cases a combination of methods is applied. A distance transform may also be used to generate or refine a glyph boundary mask.

Accordingly, embodiments of the present disclosure provide an improvement on conventional image processing and editing software by enabling generation of image masks that more accurately distinguish foreground objects from the background of an image. Some embodiments specifically enable accurate differentiation between complex text characters and fonts and the background of an image.

For example, embodiments refine a font mask (a binary image depicting an object or character) that guides the generation of the character. The background-separated image follows the boundary specified by the font style more closely. Such processed character images can be placed next to each other and issues such as overlapping boundaries and inconsistent edges are eliminated. By separating the character (the foreground) from the background in a precise manner, content creators easily overlay the character seamlessly into a target background.

Embodiments of the present disclosure can be used in the context of image generation applications. For example, an image processing apparatus based on the present disclosure receives an input image generated by a guided generative model, separates the foreground region from the background, and generates an output image including the foreground region of the input image. An example application in the image generation context is provided with reference to FIGS. 2-5. Details regarding the architecture of an example image processing system are provided with reference to FIGS. 1 and 7-11. Details regarding the process of image processing are provided with reference to FIGS. 2 and 6. Example training processes are described with reference to FIGS. 12-13.

Background Separation Process

In FIGS. 1-6, a method, apparatus, and non-transitory computer readable medium for image processing are described. One or more embodiments of the method, apparatus, and non-transitory computer readable medium include obtaining an input image and an approximate mask that approximately indicates a foreground region of the input image; generating, by an unconditional mask network, an unconditional mask of the foreground region based on the input image; generating, by a conditional mask network, a conditional mask of the foreground region based on the input image and the approximate mask; and generating an output image including the foreground region of the input image based on the unconditional mask and the conditional mask.

Some examples of the method, apparatus, and non-transitory computer readable medium further include combining the unconditional mask and the conditional mask to obtain a combined mask, where the output image is generated based on the combined mask. In some examples, the input image is generated based on the approximate mask. Some examples of the method, apparatus, and non-transitory computer readable medium further include computing a distance transformation map based on the approximate mask, where the output image is generated based on the distance transformation map.

Some examples of the method, apparatus, and non-transitory computer readable medium further include computing a color distance map based on the approximate mask, where the output image is generated based on the color distance map. Some examples of the method, apparatus, and non-transitory computer readable medium further include performing island removal on the input image, where the output image is generated based on the island removal. In some examples, the foreground region comprises text based on a font and modified with a text effect, and where the approximate mask is based on the text and the font without the text effect. In some examples, the unconditional mask comprises a probability mask and the conditional mask comprises a refined probability mask.

In some examples, the unconditional mask network is trained to generate the unconditional mask of the foreground region based on the input image and the conditional mask network is trained to generate the conditional mask of the foreground region based on the input image and the approximate mask.

FIG. 1 shows an example of an image processing system according to aspects of the present disclosure. The example shown includes user 100, user device 105, image processing apparatus 110, cloud 115, and database 120. Image processing apparatus 110 is an example of, or includes aspects of, the corresponding element described with reference to FIG. 7.

In an example shown in FIG. 1, an input image and an approximate mask are provided by a user 100 and transmitted to image processing apparatus 110, e.g., via user device 105 and cloud 115. The approximate mask approximately indicates a foreground region of the input image. In some examples, a text effect model (see FIG. 7) applies a text effect "butterfly" to text "y" and generates the input image based on the approximate mask. The input image includes wings and antennae depicting the text "y" with the text effect described by the text effect "butterfly". In some examples, the text effect model is an AI generative model such as a diffusion model.

Image processing apparatus 110 generates, by an unconditional mask network, an unconditional mask of the foreground region based on the input image. Image processing apparatus 110 generates, by a conditional mask network, a conditional mask of the foreground region based on the input image and the approximate mask. Image processing apparatus 320 generates an output image that includes the foreground region. The foreground region more precisely wraps around the lower-case letter "y" without other irrelevant objects in the input image. Image processing apparatus 110 separates the foreground (i.e., a region including one or more characters) from the background to obtain the output image.

In some examples, a text-effect model (e.g., a pixel diffusion model) generates an input image. Image processing apparatus 110 takes the input image and generates, via background separation process, an output image including the foreground region of the input image based on the unconditional mask and the conditional mask. Image processing apparatus 110 returns the output image to user 100 via cloud 115 and user device 105. The background-separated image can then be combined with other similar character images to create visually appealing text. The process of using image processing apparatus 110 is further described with reference to FIG. 2.

User device 105 may be a personal computer, laptop computer, mainframe computer, palmtop computer, personal assistant, mobile device, or any other suitable processing apparatus. In some examples, user device 105 includes software that incorporates an image processing application (e.g., an image editing application). In some examples, the image editing application on user device 105 may include functions of image processing apparatus 110.

A user interface may enable user 100 to interact with user device 105. In some embodiments, the user interface may include an audio device, such as an external speaker system, an external display device such as a display screen, or an input device (e.g., a remote control device interfaced with the user interface directly or through an I/O controller module). In some cases, a user interface may be a graphical user interface (GUI). In some examples, a user interface may be represented in code which is sent to the user device 105 and rendered locally by a browser.

Image processing apparatus 110 includes a computer implemented network comprising a user interface, an unconditional mask network, a conditional mask network, and a mask combination component. In some examples, image processing apparatus 110 includes an image generation model and a text-effect model. Image processing apparatus 110 may also include a processor unit, a memory unit, an I/O module, and a training component. The training component is used to train a machine learning model (or an image processing network). Additionally, image processing apparatus 110 can communicate with database 120 via cloud 115. In some cases, the architecture of the image processing network is also referred to as a network, a machine learning model, or a network model. Further detail regarding the architecture of image processing apparatus 110 is provided with reference to FIGS. 7-11. Further detail regarding the operation of image processing apparatus 110 is provided with reference to FIGS. 2 and 6.

In some cases, image processing apparatus 110 is implemented on a server. A server provides one or more functions to users linked by way of one or more of the various networks. In some cases, the server includes a single microprocessor board, which includes a microprocessor responsible for controlling all aspects of the server. In some cases, a server uses microprocessor and protocols to exchange data with other devices/users on one or more of the networks via hypertext transfer protocol (HTTP), and simple mail transfer protocol (SMTP), although other protocols such as file transfer protocol (FTP), and simple network management protocol (SNMP) may also be used. In some cases, a server is configured to send and receive hypertext markup language (HTML) formatted files (e.g., for displaying web pages). In various embodiments, a server comprises a general purpose computing device, a personal computer, a laptop computer, a mainframe computer, a supercomputer, or any other suitable processing apparatus.

Cloud 115 is a computer network configured to provide on-demand availability of computer system resources, such as data storage and computing power. In some examples, cloud 115 provides resources without active management by the user. The term cloud is sometimes used to describe data centers available to many users over the Internet. Some large cloud networks have functions distributed over multiple locations from central servers. A server is designated an edge server if it has a direct or close connection to a user. In some cases, cloud 115 is limited to a single organization. In other examples, cloud 115 is available to many organizations. In one example, cloud 115 includes a multi-layer communications network comprising multiple edge routers and core routers. In another example, cloud 115 is based on a local collection of switches in a single physical location.

Database 120 is an organized collection of data. For example, database 120 stores data in a specified format known as a schema. Database 120 may be structured as a single database, a distributed database, multiple distributed databases, or an emergency backup database. In some cases, a database controller may manage data storage and processing in database 120. In some cases, a user interacts with database controller. In other cases, database controller may operate automatically without user interaction.

Figure 2:
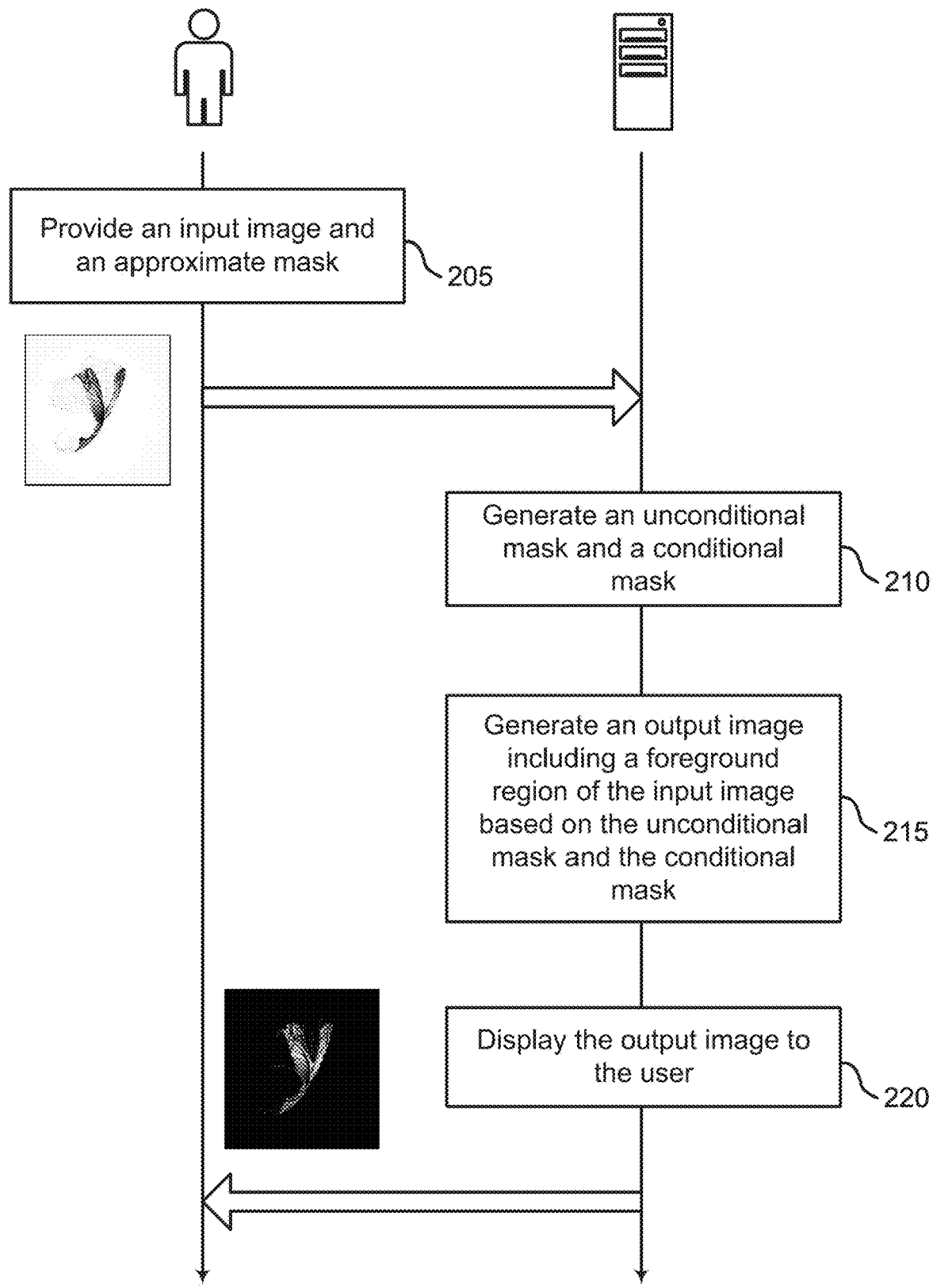
FIG. 2 shows an example of a method image generation application according to aspects of the present disclosure.

FIG. 2 shows an example of a method 200 for image generation application according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 205, the user provides an input image and an approximate mask. In some cases, the operations of this step refer to, or may be performed by, a user as described with reference to FIG. 1.

As an example shown in FIG. 2, the input image includes wings and antennae depicting the text "y" with the text effect described by the text effect "butterfly". In some examples, the approximate mask is an approximation of the foreground mask and the approximate foreground mask is to be refined in the following operations. The approximate mask (i.e., font mask) is used to guide the refinement process.

At operation 210, the system generates an unconditional mask and a conditional mask. In some cases, the operations of this step refer to, or may be performed by, an image processing apparatus as described with reference to FIGS. 1 and 7. In some examples, an unconditional mask prediction model (e.g., a first deep learning network) predicts a foreground mask based on the input image. Additionally, a conditional mask prediction model (e.g., a second deep learning network) takes the input image and the approximate mask as input. The conditional mask prediction model is configured to refine the approximate mask to obtain a predicted precise mask. One or more embodiments generate the precise mask by combining multiple sources of background priors (e.g., foreground mask probability) and combining the background priors for guided generative models.

At operation 215, the system generates an output image including a foreground region of the input image based on the unconditional mask and the conditional mask. In some cases, the operations of this step refer to, or may be performed by, an image processing apparatus as described with reference to FIGS. 1 and 7. In the above example, the foreground region includes the character "y". The foreground region more precisely wraps around the lower-case letter "y" without other irrelevant objects in the input image. Accordingly, the character "y", after background separation based on the present disclosure, can be seamlessly incorporated into a target background.

At operation 220, the system displays the output image to the user. In some cases, the operations of this step refer to, or may be performed by, an image processing apparatus as described with reference to FIGS. 1 and 7.

Figure 3:
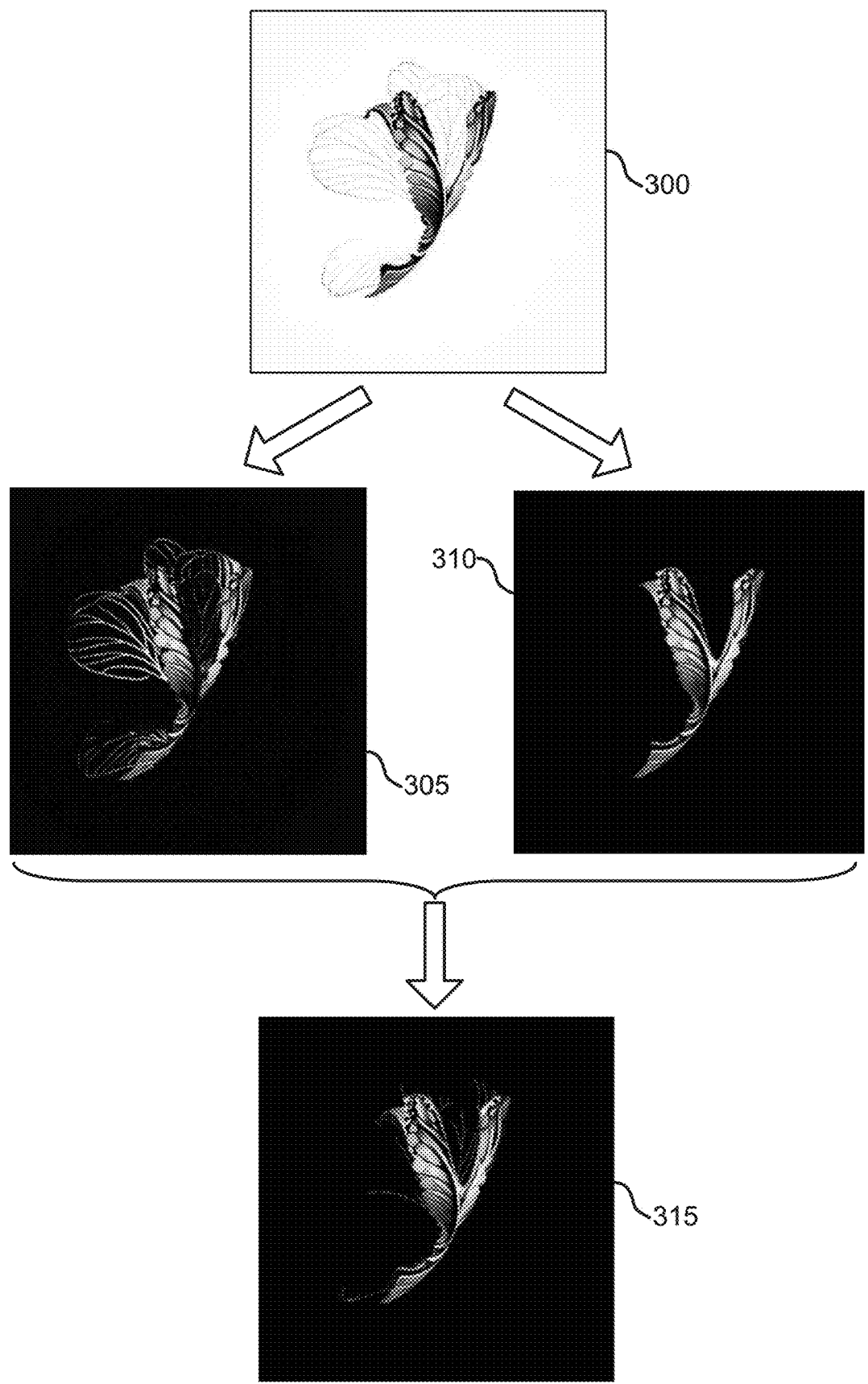
FIGS. 3 through 5 show examples of a background separation effect according to aspects of the present disclosure.

FIG. 3 shows an example of a background separation effect according to aspects of the present disclosure. The example shown includes input image 300, unconditional mask 305, conditional mask 310, and combined mask 315. In an embodiment, a mask combination component of the image processing apparatus (see FIG. 7) combines the unconditional mask 305 and the conditional mask 310 to obtain combined mask 315. An output image is generated based on combined mask 315.

In one example, the input image 300 is an image of text including one or more characters based on a particular font, with additional shapes or textures decorating the text (e.g., texture generated by a generative machine learning model). In this example, the approximate mask could be a font mask based on the original text, but without the additional shapes or textures. However, the approximate mask could represent any approximation of a foreground object. The input image 300 alone can be used to generate the unconditional mask 305, whereas the approximate mask (e.g., a font mask) is used to generate the conditional mask 310. In some examples, the conditional mask 310 is more likely to reflect the original shape (e.g., the original font shape) but may not incorporate some of the additional shapes or textures. By contrast, the unconditional mask 305 may capture the additional shapes or textures but may not correspond as well to the original shape.

In some examples, a text effect model (see FIG. 7) applies a text effect "butterfly" to text "y" and generates input image 300. Input image 300 is generated based on an approximate mask. Input image 300 includes wings and antennae attaching to text "y" with the text effect described by the text effect prompt "butterfly". The approximate mask is used to approximately indicate a foreground region of the input image 300. In some examples, the text effect model is an AI generative model such as a diffusion model. Input image 300 is an example of, or includes aspects of, the corresponding element described with reference to FIGS. 4 and 5.

Here, unconditional mask 305, conditional mask 310, or combined mask 315 can have the same resolution or size as input image 300. A mask (e.g., unconditional mask 305, conditional mask 310, combined mask 315) is used to indicate the location of a foreground region based on values of the mask (values are between 0 and 1). In the example shown in FIG. 3, the foreground region more precisely shows the letter "y". That is, the foreground region is a region having a shape of the letter "y" as shown. The image processing apparatus separates the foreground region (i.e., a region including one or more characters) from the background region of input image 300 to obtain the output image.

In this example, unconditional mask 305 includes additional content such as the butterfly wings and antennae extending from letter "y". By incorporating both masks, embodiments of the disclosure provide combined mask 315 and enable a balanced result that reflects the desired shape while also capturing additional shapes and textures. For example, combined mask 315 includes less content compared to unconditional mask 305 while combined mask 315 includes more content compared to conditional mask 310.

In some embodiments, a parameter is included to make a continuous adjustment between unconditional mask 305 and conditional mask 310 such that the image processing apparatus generates combined mask 315 based on a weighted combination of unconditional mask 305 and conditional mask 310.

Figure 4:
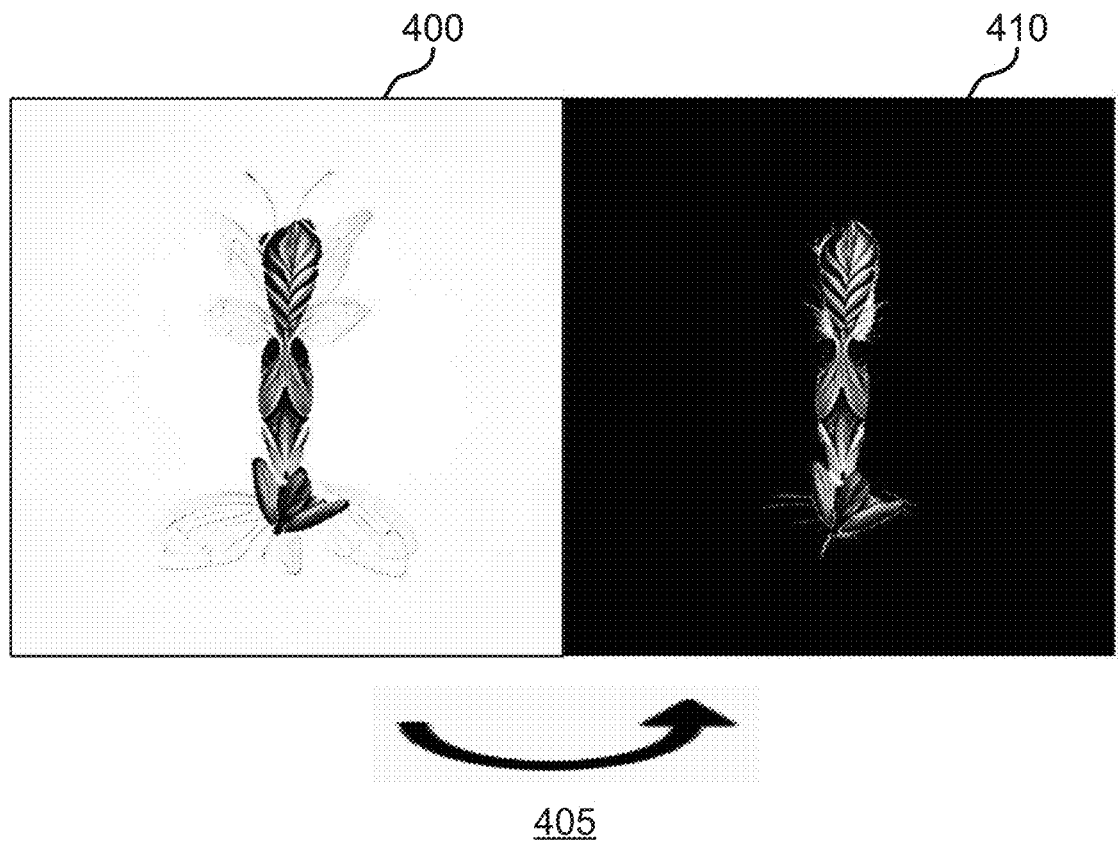

FIG. 4 shows an example of a background separation effect according to aspects of the present disclosure. The example shown includes input image 400, image processing apparatus 405, and combined mask 410. Image processing apparatus 405 is an example of, or includes aspects of, the corresponding element described with reference to FIGS. 1 and 7.

In some examples, a text effect model (see FIG. 7) applies a text effect "butterfly" to text "1" and generates input image 400. Input image 400 is generated based on an approximate mask. Input image 400 includes wings and antennae attached to text "1" with the text effect described by the text effect prompt "butterfly". The approximate mask is used to approximately indicate a foreground region of the input image 400. Image processing apparatus 405 generates combined mask 410. The combined mask 410 is generated based on a combination of an unconditional mask and a conditional mask.

Here, unconditional mask, conditional mask, or combined mask 410 can have the same resolution or size as input image 400. A mask (e.g., unconditional mask, conditional mask, combined mask 410) is used to indicate the location of a foreground region based on values of the mask (values are between 0 and 1). In the example shown in FIG. 4, the foreground region more precisely shows the letter "1". That is, the foreground region is a region having a shape of the letter "1" as shown. The image processing apparatus 405 separates the foreground region (i.e., a region including one or more characters) from the background region of input image 400 to obtain the output image.

Input image 400 is an example of, or includes aspects of, the corresponding element described with reference to FIGS. 3 and 5. Combined mask 410 is an example of, or includes aspects of, the corresponding element described with reference to FIGS. 3 and 5.

Figure 5:
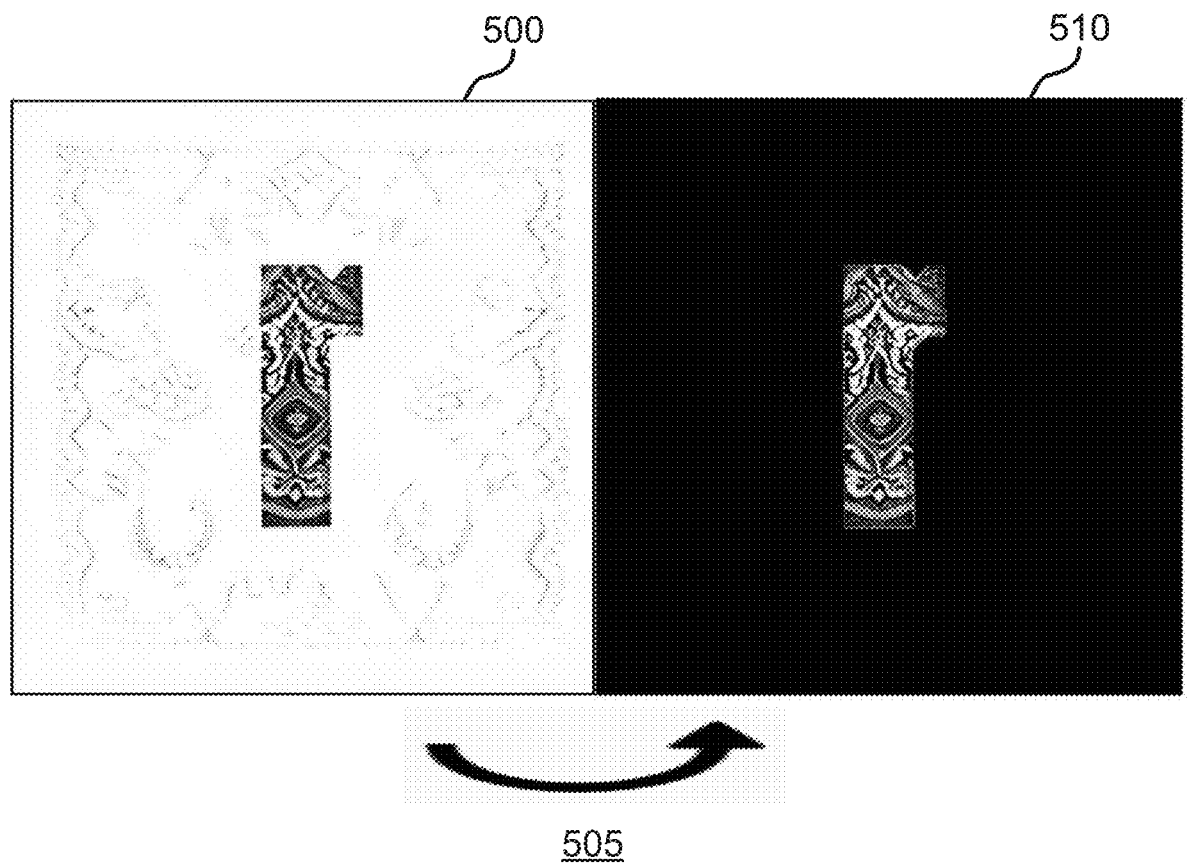

FIG. 5 shows an example of a background separation effect according to aspects of the present disclosure. The example shown includes input image 500, image processing apparatus 505, and combined mask 510. Image processing apparatus 505 is an example of, or includes aspects of, the corresponding element described with reference to FIGS. 1 and 7.

In some examples, a text effect model (see FIG. 7) applies a text effect to text "r" and generates input image 500. Input image 500 is generated based on an approximate mask. Input image 500 depicts the lower-case letter "r" with the text effect described by a text effect prompt. The approximate mask is used to approximately indicate a foreground region of the input image 500. Image processing apparatus 505 generates combined mask 510. The combined mask 510 is generated based on a combination of an unconditional mask and a conditional mask.

Here, unconditional mask, conditional mask, or combined mask 510 can have the same resolution or size as input image 500. A mask (e.g., unconditional mask, conditional mask, combined mask 510) is used to indicate the location of a foreground region based on values of the mask (values are between 0 and 1). In the example shown in FIG. 5, the foreground region more precisely shows the letter "r". That is, the foreground region is a region having a shape of the letter "r" as shown. The image processing apparatus 405 separates the foreground region (i.e., a region including one or more characters) from the background region of input image 500 to obtain the output image.

Input image 500 is an example of, or includes aspects of, the corresponding element described with reference to FIGS. 3 and 4. Combined mask 510 is an example of, or includes aspects of, the corresponding element described with reference to FIGS. 3 and 4.

Figure 6:
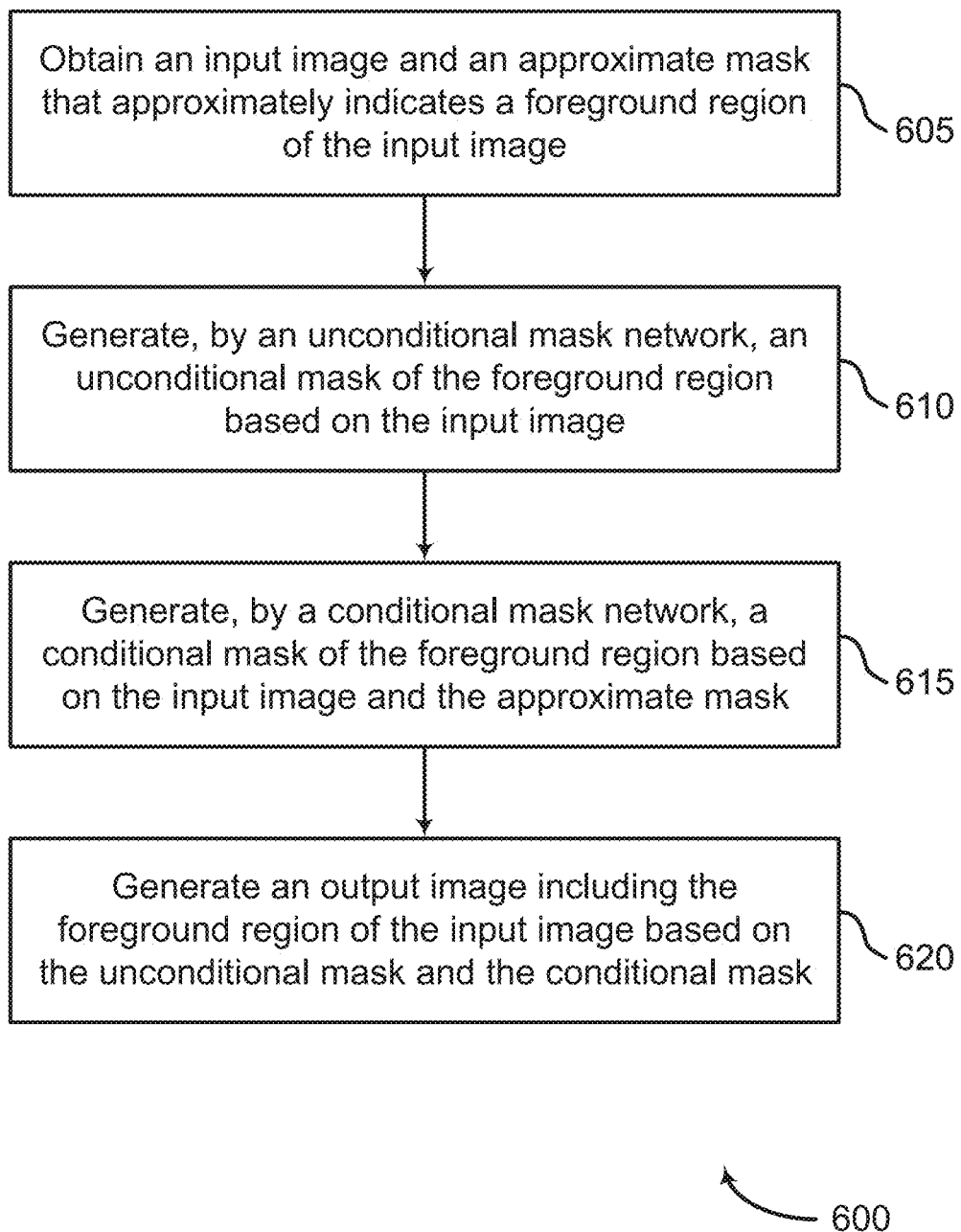
FIG. 6 shows an example of a method for image processing according to aspects of the present disclosure.

FIG. 6 shows an example of a method 600 for image processing according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 605, the system obtains an input image and an approximate mask that approximately indicates a foreground region of the input image. In some cases, the operations of this step refer to, or may be performed by, a user interface as described with reference to FIGS. 7 and 10.

At operation 610, the system generates, by an unconditional mask network, an unconditional mask of the foreground region based on the input image. In some cases, the operations of this step refer to, or may be performed by, an unconditional mask network as described with reference to FIGS. 7 and 10.

According to some embodiments of the present disclosure, a machine learning model separates the foreground (i.e., one or more characters of an input image) from the background of the input image. In some cases, a text-effect model generates the input image.

In some examples, an unconditional mask network of the machine learning model computes or generates an unconditional foreground probability mask based exclusively on the input image. In some cases, the input image is also referred to as a generated image or a synthesized image. The generated foreground probability mask includes more than the desired region or target region and is imprecise near the boundaries.

At operation 615, the system generates, by a conditional mask network, a conditional mask of the foreground region based on the input image and the approximate mask. In some cases, the operations of this step refer to, or may be performed by, a conditional mask network as described with reference to FIGS. 7 and 10.

In some embodiments, a conditional mask network of the machine learning model computes or generates a conditional foreground probability mask based on the font mask and the input image. The second deep learning network takes the input image having the character and a crude approximation of the foreground mask as input and refines the approximate foreground mask. The font mask (i.e., as an approximate mask) is used to guide the refinement process. The unconditional mask network and the conditional mask network are separate deep learning networks.

At operation 620, the system generates an output image including the foreground region of the input image based on the unconditional mask and the conditional mask. In some cases, the operations of this step refer to, or may be performed by, an image generation model as described with reference to FIGS. 7 and 10.

Network Architecture

In FIGS. 7-11, an apparatus and method for image processing are described. One or more embodiments of the apparatus and method include at least one processor; at least one memory including instructions executable by the at least one processor; a user interface comprising parameters stored in the at least one memory and configured to obtain an input image and an approximate mask that approximately indicates a foreground region of the input image; an unconditional mask network comprising parameters stored in the at least one memory and configured to generate an unconditional mask of the foreground region based on the input image; and a conditional mask network comprising parameters stored in the at least one memory and configured to generate a conditional mask of the foreground region based on the input image and the approximate mask.

Some examples of the apparatus and method further include generating an output image, via background separation process, based on the unconditional mask and the conditional mask where the output image includes the foreground region of the input image. Some examples of the apparatus and method further include a distance transform component configured to compute a distance transformation map based on the approximate mask, where the output image is generated based on the distance transformation map.

Some examples of the apparatus and method further include a color distance component configured to compute a color distance map based on the approximate mask, where the output image is generated based on the color distance map. Some examples of the apparatus and method further include an island removal component configured to perform island removal on the input image, where the output image is generated based on the island removal. Some examples of the apparatus and method further include a mask combination component configured to combine the unconditional mask and the conditional mask to obtain a combined mask, where the output image is generated based on the combined mask. Some examples of the apparatus and method further include a text-effect model configured to generate the input image.

Figure 7:
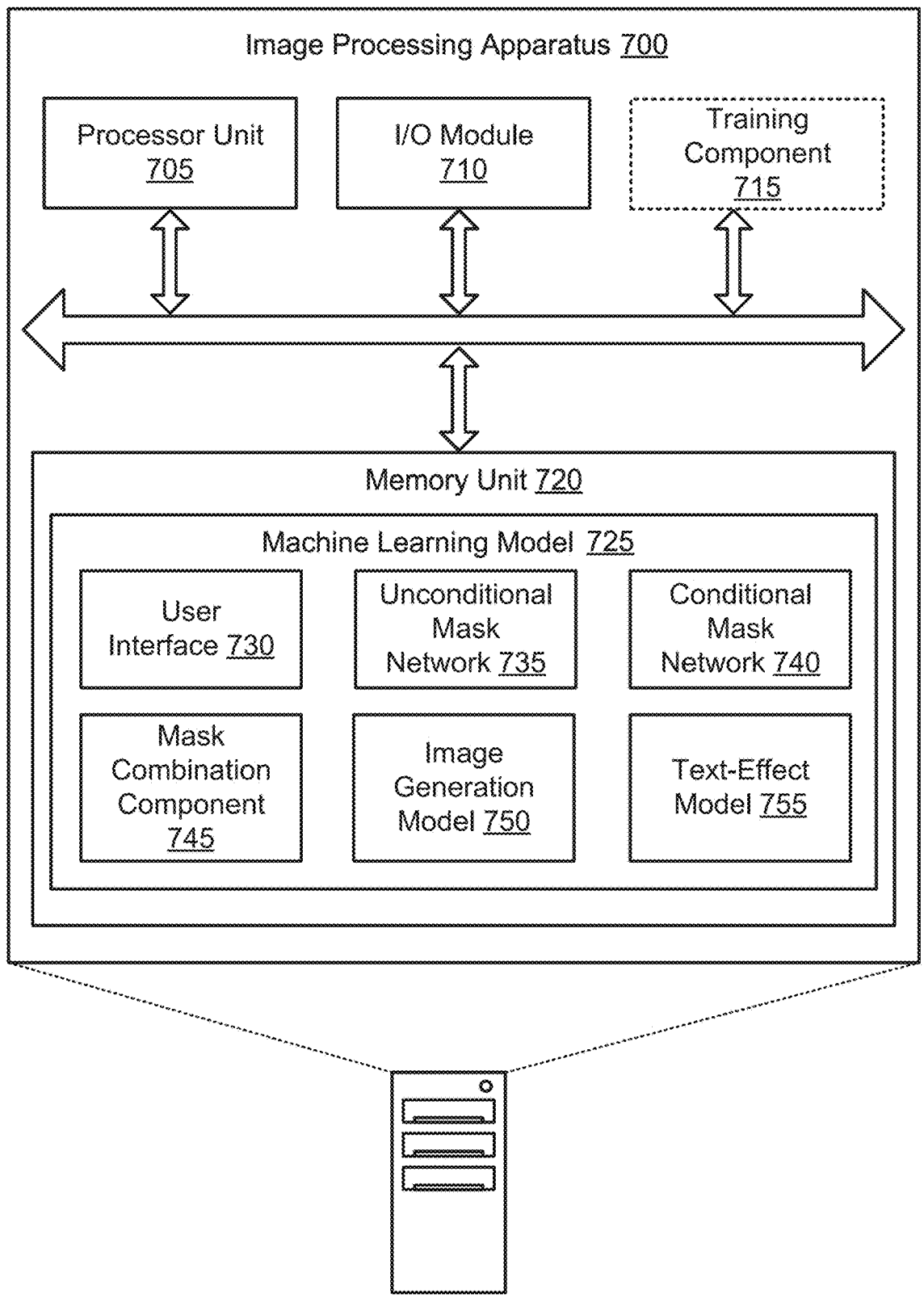
FIG. 7 shows an example of an image processing apparatus according to aspects of the present disclosure.

FIG. 7 shows an example of an image processing apparatus 700 according to aspects of the present disclosure. The example shown includes image processing apparatus 700, processor unit 705, I/O module 710, training component 715, memory unit 720, and machine learning model 725. Image processing apparatus 700 is an example of, or includes aspects of, the corresponding element described with reference to FIG. 1.

Machine learning model 725 is an example of, or includes aspects of, the corresponding element described with reference to FIG. 10. In one embodiment, machine learning model 725 includes user interface 730, unconditional mask network 735, conditional mask network 740, mask combination component 745, image generation model 750, and text-effect model 755.

Processor unit 705 is an intelligent hardware device, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or any combination thereof). In some cases, processor unit 705 is configured to operate a memory array using a memory controller. In other cases, a memory controller is integrated into the processor. In some cases, processor unit 705 is configured to execute computer-readable instructions stored in a memory to perform various functions. In some embodiments, processor unit 705 includes special purpose components for modem processing, baseband processing, digital signal processing, or transmission processing.

Examples of memory unit 720 include random access memory (RAM), read-only memory (ROM), or a hard disk. Examples of memory unit 720 include solid state memory and a hard disk drive. In some examples, memory unit 720 is used to store computer-readable, computer-executable software including instructions that, when executed, cause a processor to perform various functions described herein. In some cases, memory unit 720 contains, among other things, a basic input/output system (BIOS) which controls basic hardware or software operations such as the interaction with peripheral components or devices. In some cases, a memory controller operates memory cells. For example, the memory controller can include a row decoder, column decoder, or both. In some cases, memory cells within memory unit 720 store information in the form of a logical state.

In some examples, at least one memory unit 720 includes instructions executable by the at least one processor unit 705. Memory unit 720 includes machine learning model 725 or stores parameters of machine learning model 725.

I/O module 710 (e.g., an input/output interface) may include an I/O controller. An I/O controller may manage input and output signals for a device. I/O controller may also manage peripherals not integrated into a device. In some cases, an I/O controller may represent a physical connection or port to an external peripheral. In some cases, an I/O controller may utilize an operating system such as iOS®, ANDROID®, MS-DOS®, MS-WINDOWS®, OS/2®, UNIX®, LINUX®, or another known operating system. In other cases, an I/O controller may represent or interact with a modem, a keyboard, a mouse, a touchscreen, or a similar device. In some cases, an I/O controller may be implemented as part of a processor. In some cases, a user may interact with a device via an I/O controller or via hardware components controlled by an I/O controller.

In some examples, I/O module 710 includes a user interface. A user interface may enable a user to interact with a device. In some embodiments, the user interface may include an audio device, such as an external speaker system, an external display device such as a display screen, or an input device (e.g., remote control device interfaced with the user interface directly or through an I/O controller module). In some cases, a user interface may be a graphical user interface (GUI). In some examples, a communication interface operates at the boundary between communicating entities and the channel and may also record and process communications. Communication interface is provided herein to enable a processing system coupled to a transceiver (e.g., a transmitter and/or a receiver). In some examples, the transceiver is configured to transmit (or send) and receive signals for a communications device via an antenna.

According to some embodiments of the present disclosure, image processing apparatus 700 includes a computer implemented artificial neural network (ANN) for mask prediction and image generation. An ANN is a hardware or a software component that includes a number of connected nodes (i.e., artificial neurons), which loosely correspond to the neurons in a human brain. Each connection, or edge, transmits a signal from one node to another (like the physical synapses in a brain). When a node receives a signal, it processes the signal and then transmits the processed signal to other connected nodes. In some cases, the signals between nodes comprise real numbers, and the output of each node is computed by a function of the sum of its inputs. Each node and edge is associated with one or more node weights that determine how the signal is processed and transmitted.

According to some embodiments, image processing apparatus 700 includes a convolutional neural network (CNN) for image processing (e.g., image encoding, image decoding). CNN is a class of neural networks that is commonly used in computer vision or image classification systems. In some cases, a CNN may enable processing of digital images with minimal pre-processing. A CNN may be characterized by the use of convolutional (or cross-correlational) hidden layers. These layers apply a convolution operation to the input before signaling the result to the next layer. Each convolutional node may process data for a limited field of input (i.e., the receptive field). During a forward pass of the CNN, filters at each layer may be convolved across the input volume, computing the dot product between the filter and the input. During the training process, the filters may be modified so that they activate when they detect a particular feature within the input.

According to some embodiments, training component 715 initializes an unconditional mask network 735 and a conditional mask network 740. In some examples, training component 715 receives training data including an input image, an approximate mask indicating a foreground region of the input image, and a ground-truth mask. Training component 715 trains, using the training data, the unconditional mask network 735 to generate an unconditional mask of the foreground region based on the input image. Training component 715 trains, using the training data, the conditional mask network 740 to generate a conditional mask of the foreground region based on the input image and the approximate mask. In some cases, training component 715 (shown in dashed line) is implemented on an apparatus other than image processing apparatus 700.

According to some embodiments, user interface 730 obtains an input image and an approximate mask that approximately indicates a foreground region of the input image. In some examples, the foreground region includes text based on a font and modified with a text effect, and where the approximate mask is based on the text and the font without the text effect.

According to some embodiments, user interface 730 includes parameters stored in the at least one memory and configured to obtain an input image and an approximate mask that approximately indicates a foreground region of the input image. User interface 730 is an example of, or includes aspects of, the corresponding element described with reference to FIG. 10.

According to some embodiments, unconditional mask network 735 generates an unconditional mask of the foreground region based on the input image. In some examples, the unconditional mask includes a probability mask. Unconditional mask network 735 is an example of, or includes aspects of, the corresponding element described with reference to FIG. 10.

According to some embodiments, conditional mask network 740 generates a conditional mask of the foreground region based on the input image and the approximate mask. In some examples, the conditional mask includes a refined probability mask. Conditional mask network 740 is an example of, or includes aspects of, the corresponding element described with reference to FIG. 10.

According to some embodiments, mask combination component 745 combines the unconditional mask and the conditional mask to obtain a combined mask, where the output image is generated based on the combined mask. Mask combination component 745 is an example of, or includes aspects of, the corresponding element described with reference to FIG. 10.

In some examples, the input image is generated based on the approximate mask. In some examples, text-effect model 755 is configured to generate the input image. According to some embodiments, an output image is generated via background separation process and the output image includes the foreground region of the input image based on the unconditional mask and the conditional mask.

Figure 8:
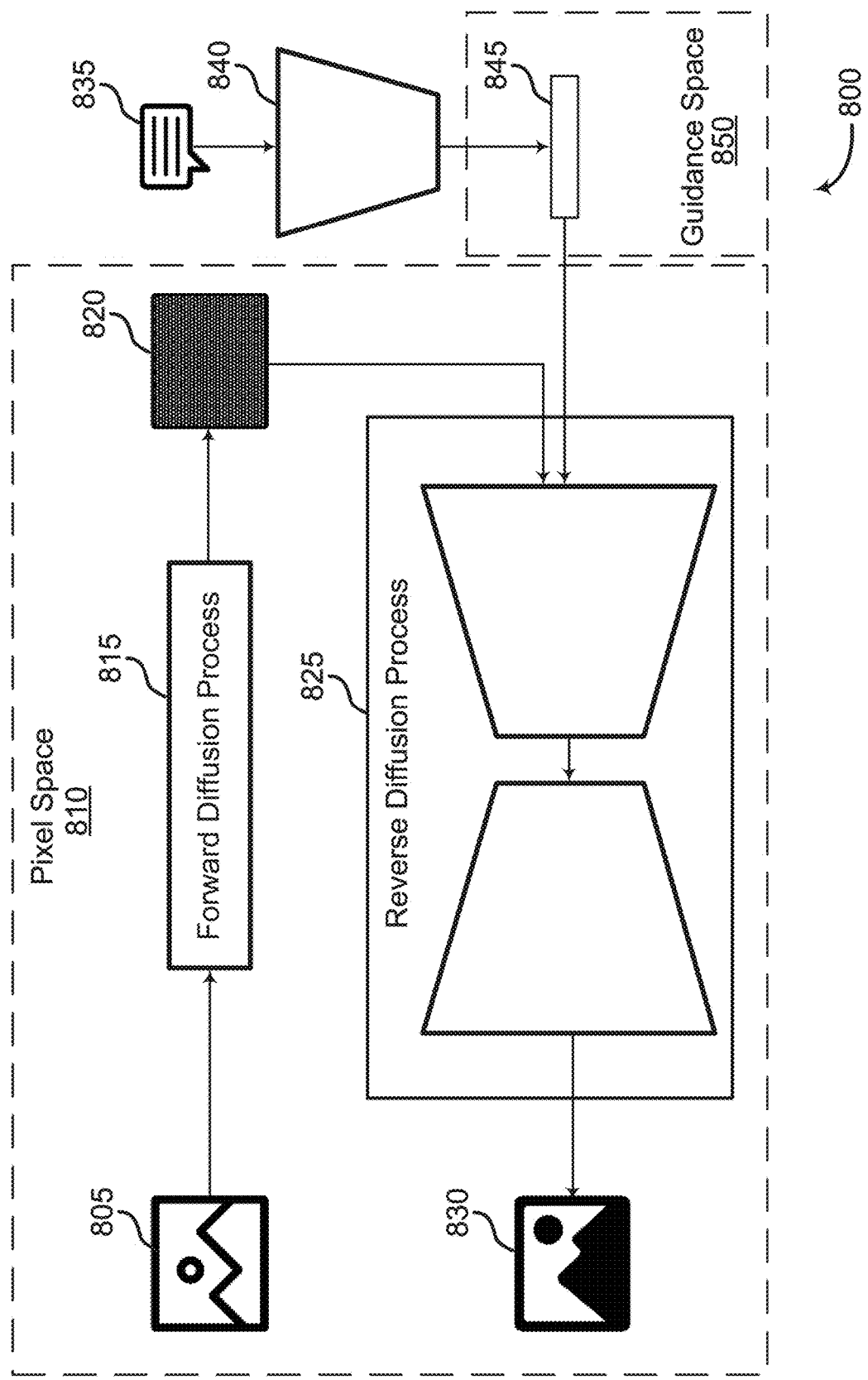
FIG. 8 shows an example of a guided diffusion model according to aspects of the present disclosure.

FIG. 8 shows an example of a guided diffusion model 800 according to aspects of the present disclosure. The example shown includes guided diffusion model 800, original image 805, pixel space 810, forward diffusion process 815, noisy images 820, reverse diffusion process 825, output image 830, text prompt 835, text encoder 840, guidance features 845, and guidance space 850. The guided diffusion model 800 is an example of, or includes aspects of, the corresponding element described with reference to FIG. 7 (see text-effect model 755).

Diffusion models are a class of generative neural networks which can be trained to generate new data with features similar to features found in training data. In particular, diffusion models can be used to generate novel images. Diffusion models can be used for various image generation tasks including image super-resolution, generation of images with perceptual metrics, conditional generation (e.g., generation based on text guidance), image inpainting, and image manipulation.

Types of diffusion models include Denoising Diffusion Probabilistic Models (DDPMs) and Denoising Diffusion Implicit Models (DDIMs). In DDPMs, the generative process includes reversing a stochastic Markov diffusion process. DDIMs, on the other hand, use a deterministic process so that the same input results in the same output. Diffusion models may also be characterized by whether the noise is added to the image itself, or to image features generated by an encoder (i.e., latent diffusion).

Diffusion models work by iteratively adding noise to the data during a forward process and then learning to recover the data by denoising the data during a reverse process. For example, during training, guided diffusion model 800 may take an original image 805 in a pixel space 810 as input and apply forward diffusion process 815 to gradually add noise to the original image 805 to obtain noisy images 820 at various noise levels.

Next, a reverse diffusion process 825 (e.g., a U-Net ANN) gradually removes the noise from the noisy images 820 at the various noise levels to obtain an output image 830. In some cases, an output image 830 is created from each of the various noise levels. The output image 830 can be compared to the original image 805 to train the reverse diffusion process 825.

The reverse diffusion process 825 can also be guided based on a text prompt 835, or another guidance prompt, such as an image, a layout, a segmentation map, etc. The text prompt 835 can be encoded using a text encoder 840 (e.g., a multimodal encoder) to obtain guidance features 845 in guidance space 850. The guidance features 845 can be combined with the noisy images 820 at one or more layers of the reverse diffusion process 825 to ensure that the output image 830 includes content described by the text prompt 835. For example, guidance features 845 can be combined with the noisy features using a cross-attention block within the reverse diffusion process 825.

Original image 805 is an example of, or includes aspects of, the corresponding element described with reference to FIG. 11. Forward diffusion process 815 is an example of, or includes aspects of, the corresponding element described with reference to FIG. 11. Reverse diffusion process 825 is an example of, or includes aspects of, the corresponding element described with reference to FIG. 11. Output image 830 is an example of, or includes aspects of, the corresponding element described with reference to FIGS. 3-5.

Figure 9:
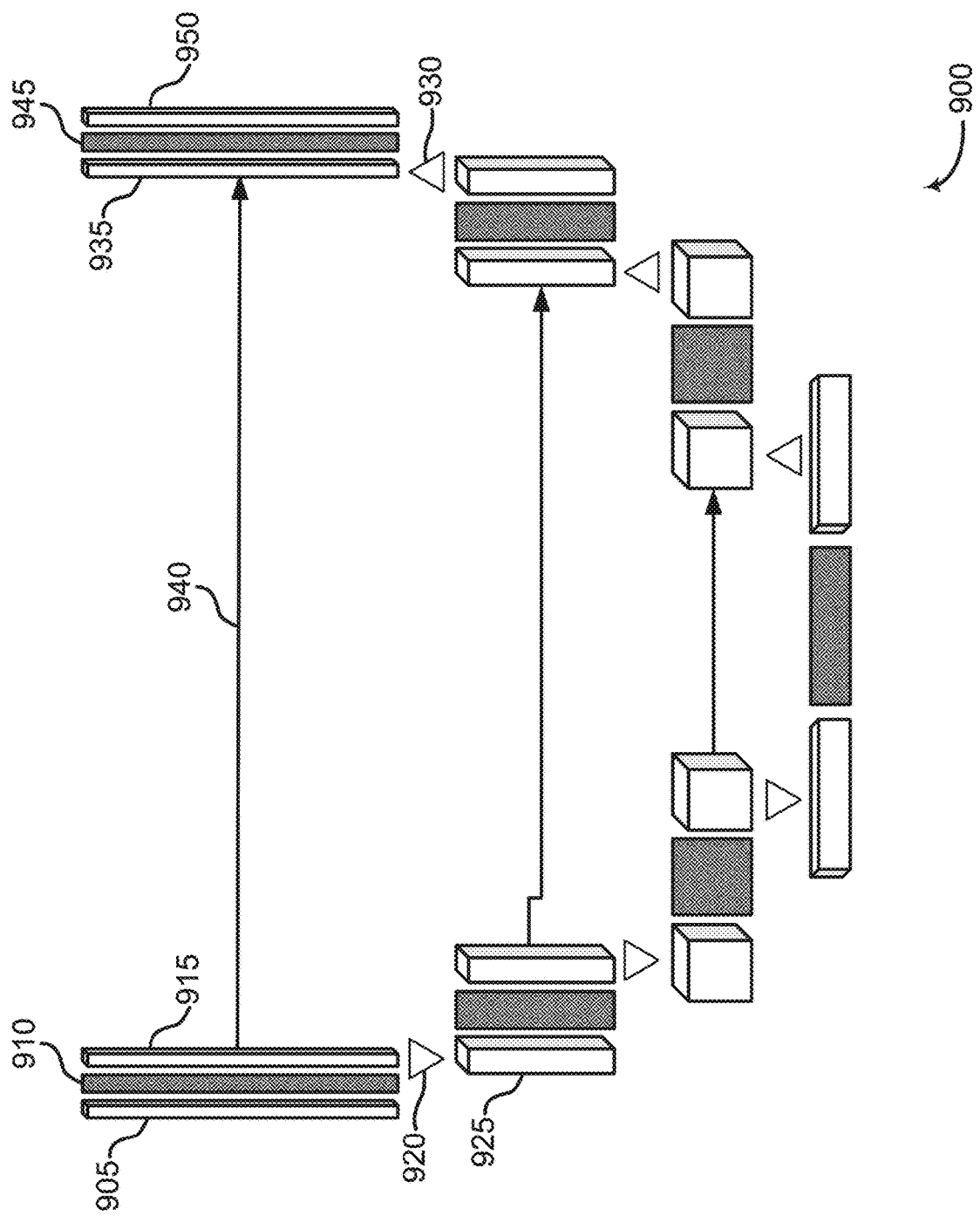
FIG. 9 shows an example of a U-Net according to aspects of the present disclosure.

FIG. 9 shows an example of U-Net 900 according to aspects of the present disclosure. The example shown includes U-Net 900, input features 905, initial neural network layer 910, intermediate features 915, down-sampling layer 920, down-sampled features 925, up-sampling process 930, up-sampled features 935, skip connection 940, final neural network layer 945, and output features 950.

In some examples, diffusion models are based on a neural network architecture known as a U-Net. The U-Net 900 takes input features 905 having an initial resolution and an initial number of channels, and processes the input features 905 using an initial neural network layer 910 (e.g., a convolutional network layer) to produce intermediate features 915. The intermediate features 915 are then down-sampled using a down-sampling layer 920 such that down-sampled features 925 features have a resolution less than the initial resolution and a number of channels greater than the initial number of channels.

This process is repeated multiple times, and then the process is reversed. That is, the down-sampled features 925 are up-sampled using up-sampling process 930 to obtain up-sampled features 935. The up-sampled features 935 can be combined with intermediate features 915 having a same resolution and number of channels via a skip connection 940. These inputs are processed using a final neural network layer 945 to produce output features 950. In some cases, the output features 950 have the same resolution as the initial resolution and the same number of channels as the initial number of channels.

In some cases, U-Net 900 takes additional input features to produce conditionally generated output. For example, the additional input features could include a vector representation of an input prompt. The additional input features can be combined with the intermediate features 915 within the neural network at one or more layers. For example, a cross-attention module can be used to combine the additional input features and the intermediate features 915.

Figure 10:
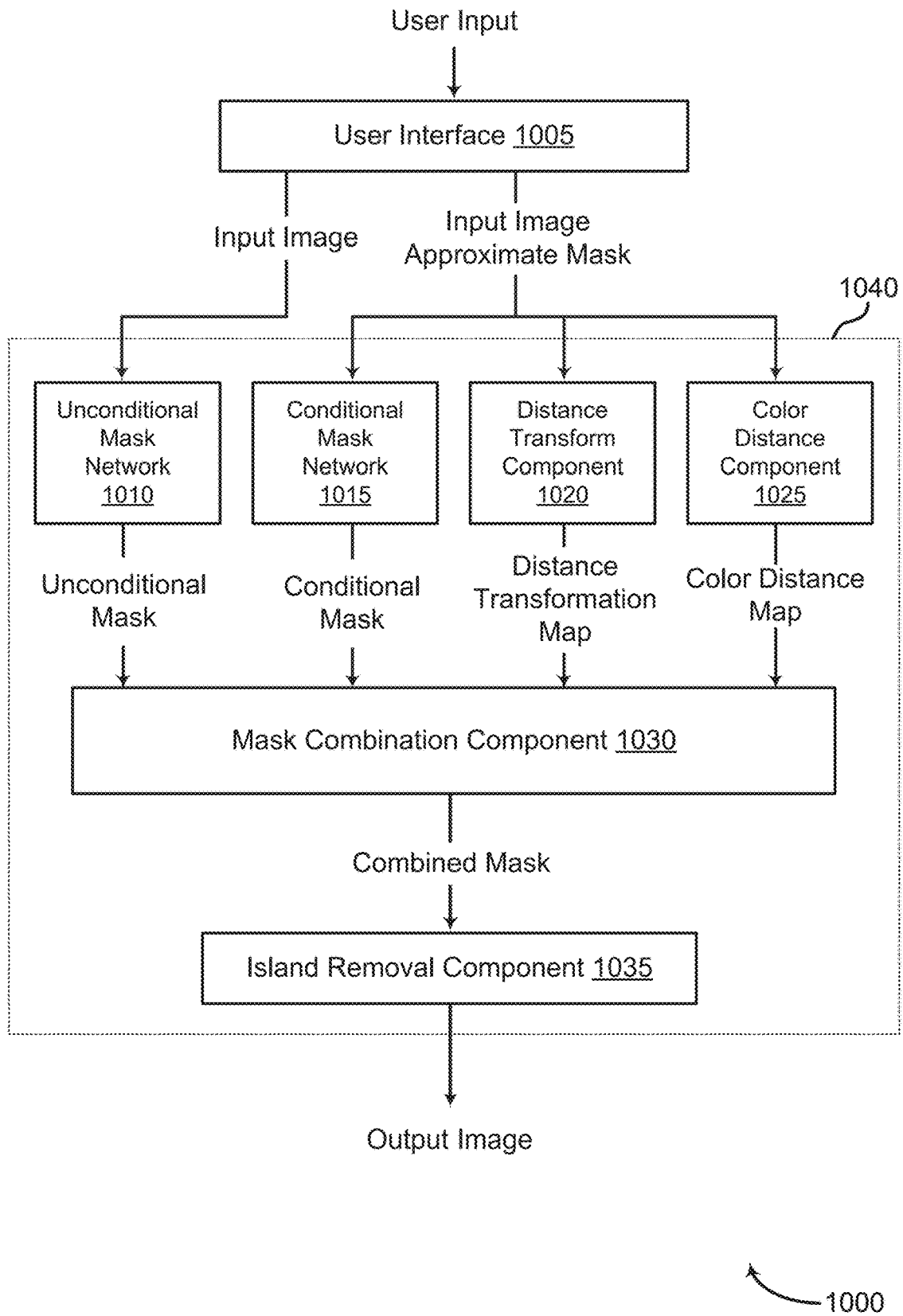
FIG. 10 shows an example of a machine learning model according to aspects of the present disclosure.

FIG. 10 shows an example of a machine learning model 1000 according to aspects of the present disclosure. The example shown includes machine learning model 1000, user interface 1005, unconditional mask network 1010, conditional mask network 1015, distance transform component 1020, color distance component 1025, mask combination component 1030, island removal component 1035, and background separation process 1040. Machine learning model 1000 is an example of, or includes aspects of, the corresponding element described with reference to FIG. 7.

According to some embodiments of the present disclosure, user interface 1005 is configured to obtain an input image and an approximate mask that approximately indicates a foreground region of the input image. User interface 1005 is an example of, or includes aspects of, the corresponding element described with reference to FIG. 7. In some examples, the input image is generated by a text-effect model such as a diffusion model (see FIG. 7).

Unconditional mask network 1010 is configured to generate an unconditional mask of the foreground region based on the input image. Conditional mask network 1015 is configured to generate a conditional mask of the foreground region based on the input image and the approximate mask. Unconditional mask network 1010 is an example of, or includes aspects of, the corresponding element described with reference to FIG. 7. Conditional mask network 1015 is an example of, or includes aspects of, the corresponding element described with reference to FIG. 7.

In one example, the input image is an image of text including one or more characters based on a particular font, with additional shapes or textures decorating the text (e.g., texture generated by a generative machine learning model). In this example, the approximate mask could be a font mask based on the original text, but without the additional shapes or textures. However, the approximate mask could represent any approximation of a foreground object. The input image alone can be used to generate the unconditional mask, whereas the approximate mask (e.g., a font mask) is used to generate the conditional mask. In some examples, the conditional mask is more likely to reflect the original shape (e.g., the original font shape) but may not incorporate some of the additional shapes or textures. By contrast, the unconditional mask may capture the additional shapes or textures but may not correspond as well to the original shape. By incorporating both masks, embodiments of the disclosure enable a balanced result that reflects the desired shape while also capturing additional shapes and textures.

In some cases, additional factors such as a distance transformation map or a color distance map can be used to combine the conditional and unconditional mask. According to some embodiments, distance transform component 1020 computes a distance transformation map based on the approximate mask, where the output image is generated based on the distance transformation map. Distance transform component 1020 of machine learning model 1000 is configured to compute or generate another estimate of foreground probability mask via distance by calculating a distance transform using the font mask.

According to some embodiments, color distance component 1025 computes a color distance map based on the approximate mask, where the output image is generated based on the color distance map. Color distance component 1025 generates another estimate of foreground probability mask by computing the ratio of the distance to the average of the pixel values inside the font mask versus outside the font mask.

Mask combination component 1030 of machine learning model 1000 combines the unconditional foreground probability mask, the conditional foreground probability mask, the foreground probability mask via distance transformation, and the foreground probability mask via color into one combined estimate for the foreground mask. The combined mask wraps around edges more precisely compared to the earlier foreground mask estimates. Mask combination component 1030 is an example of, or includes aspects of, the corresponding element described with reference to FIG. 7.

In some examples, mask combination component 1030 generates the combined mask as follows. Let: X=distance transform map+conditional mask+color map, Y=unconditional mask, and final mask is formulated as final mask=f(X)*g(Y)+C, where f and g are linear functions and C is constant.

In some examples, the color map is the ratio of the distance to the foreground color and the distance to the background color. The foreground color is obtained by averaging all the pixels that lie within the approximate mask while the background color is obtained by averaging the ones outside it. The distance transform map is zero outside the approximate mask. Within the region defined by the approximate mask, pixels closer to the center (away from the boundary of the approximate mask) have a higher value.

In some embodiments, island removal component 1035 performs island removal on the input image, where the output image is generated based on the island removal. An island removal operation, via island removal component 1035 is applied to eliminate small objects that lie outside the region defined by the font mask. Island removal is configured to find the connected components of the mask and if the connected component overlaps with the approximate mask, then island removal component 1035 is configured to keep it. Otherwise, island removal component 1035 is configured to discard it. A connected component, or an object, in a binary image is a set of adjacent pixels. Determining which pixels are adjacent depends on how pixel connectivity is defined. For a two-dimensional image, there are two types of connectivity. They are 4-connectivity (pixels are connected if their edges touch) and 8-connectivity (pixels are connected if their edges or corners touch).

In some embodiments, ground-truth masks are used for training the models, i.e., unconditional mask network 1010 and conditional mask network 1015.

In some embodiments, an output image is generated via background separation process and the output image includes the foreground region of the input image based on the unconditional mask and the conditional mask.

Figure 11:
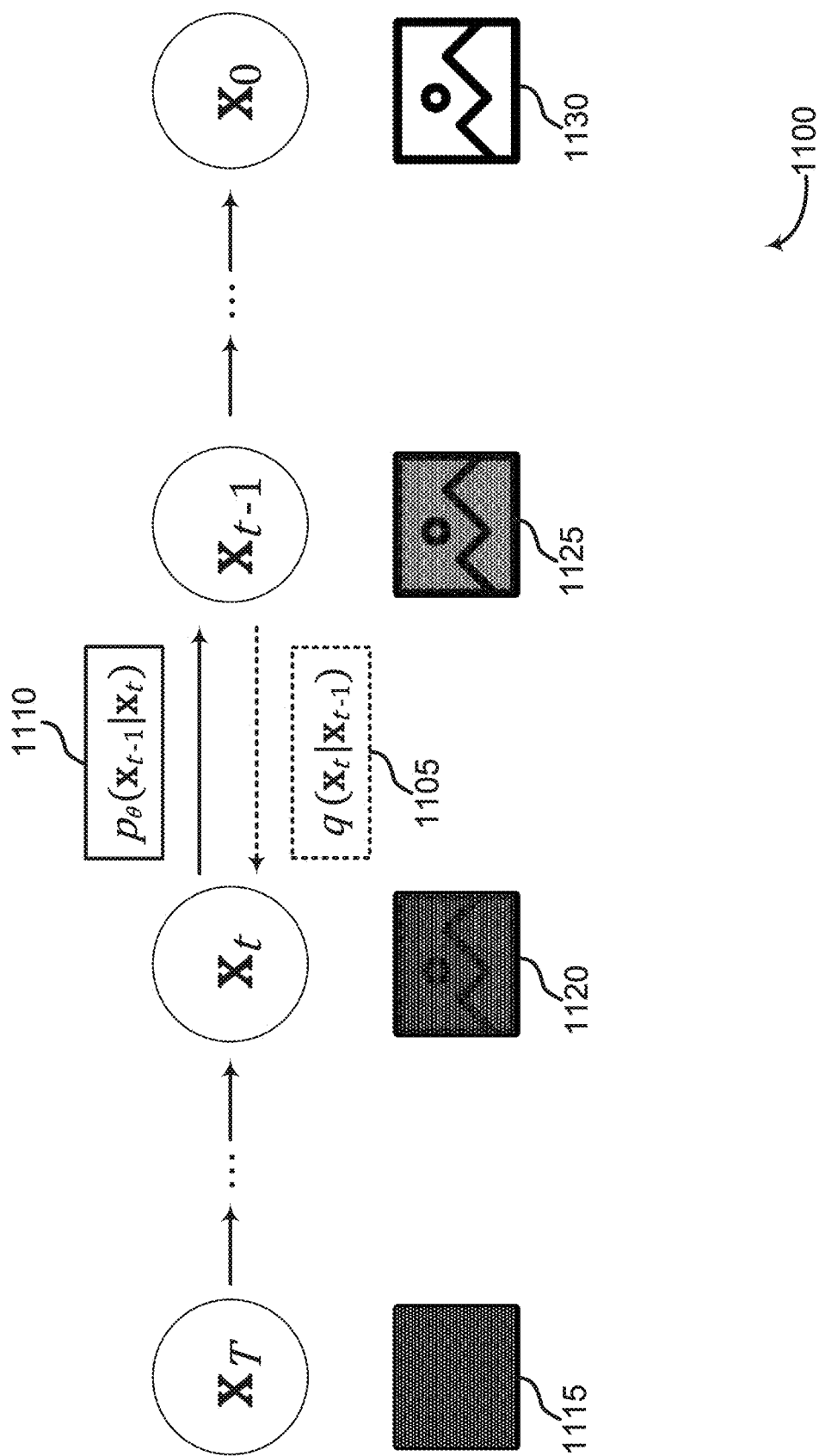
FIG. 11 shows an example of a diffusion process according to aspects of the present disclosure.

FIG. 11 shows an example of a diffusion process 1100 according to aspects of the present disclosure. The example shown includes diffusion process 1100, forward diffusion process 1105, reverse diffusion process 1110, noisy image 1115, first intermediate image 1120, second intermediate image 1125, and original image 1130.

As described above with reference to FIG. 8, a diffusion model can include both a forward diffusion process 1105 for adding noise to an image (or features in a latent space) and a reverse diffusion process 1110 for denoising the images (or features) to obtain a denoised image. The forward diffusion process 1105 can be represented as $q(x_t| x_{t-1})$, and the reverse diffusion process 1110 can be represented as $p(x_{t-1}| x_t)$. In some cases, the forward diffusion process 1105 is used during training to generate images with successively greater noise, and a neural network is trained to perform the reverse diffusion process 1110 (i.e., to successively remove the noise).

In an example forward process for a latent diffusion model, the model maps an observed variable $x_0$ (either in a pixel space or a latent space) intermediate variables $x_1, \ldots, x_T$ using a Markov chain. The Markov chain gradually adds Gaussian noise to the data to obtain the approximate posterior $q(x_{1:T}|x_0)$ as the latent variables are passed through a neural network such as a U-Net, where $x_1, \ldots, x_T$ have the same dimensionality as $x_0$.

The neural network may be trained to perform the reverse process. During the reverse diffusion process 1110, the model begins with noisy data $x_T$, such as a noisy image 1115 and denoises the data to obtain the $p(x_{t-1}|x)$. At each step t−1, the reverse diffusion process 1110 takes $x_t$, such as first intermediate image 1120, and t as input. Here, t represents a step in the sequence of transitions associated with different noise levels, The reverse diffusion process 1110 outputs $x_{t-1}$, such as second intermediate image 1125 iteratively until $x_T$ is reverted back to $x_0$, the original image 1130. The reverse process can be represented as:

$$P_\theta(x_{t-1} | x_t) := N(x_{t-1}; \mu_\theta(x_t, t), \Sigma_\theta(x_t, t)). \qquad (1)$$

The joint probability of a sequence of samples in the Markov chain can be written as a product of conditionals and the marginal probability:

$$x_T : p_\theta(x_{0T}) := p(x_T)\Pi_{t=1}^T p_\theta(x_{t-1} | x_t), \qquad (2)$$

where $p(x_T)=N(x_T; 0,1)$ is the pure noise distribution as the reverse process takes the outcome of the forward process, a sample of pure noise, as input and $\Pi_{t=1}^T p_\theta(x_{t-1}|x_t)$ represents a sequence of Gaussian transitions corresponding to a sequence of addition of Gaussian noise to the sample.

At interference time, observed data $x_0$ in a pixel space can be mapped into a latent space as input, and a generated data x̃ is mapped back into the pixel space from the latent space as output. In some examples, $x_0$ represents an original input image with low image quality, latent variables $x_1, \ldots, x_T$ represent noisy images, and % represents the generated image with high image quality.

Forward diffusion process 1105 is an example of, or includes aspects of, the corresponding element described with reference to FIG. 8. Reverse diffusion process 1110 is an example of, or includes aspects of, the corresponding element described with reference to FIG. 8. Original image 1130 is an example of, or includes aspects of, the corresponding element described with reference to FIG. 8.

Training and Evaluation

Figure 12:
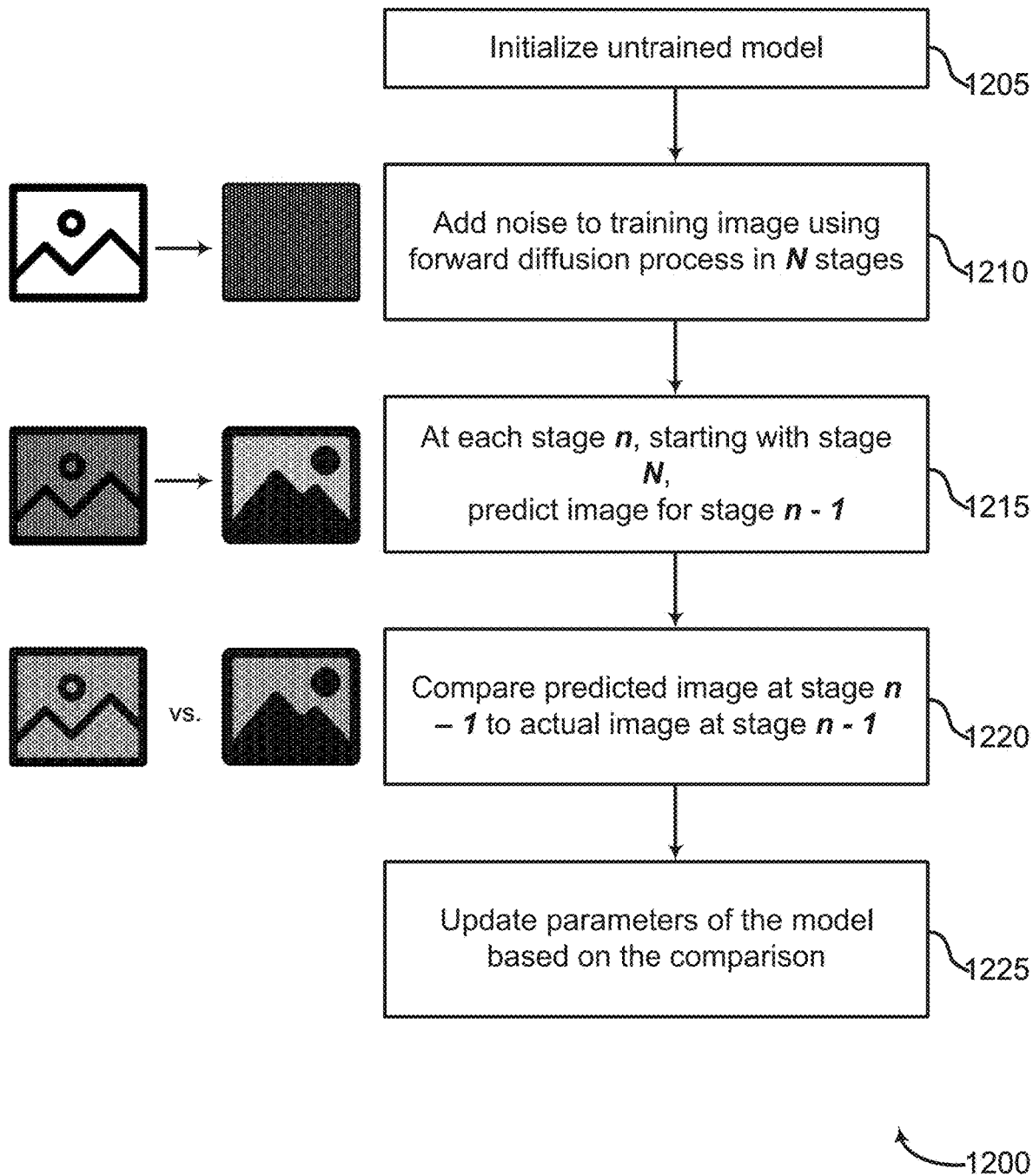
FIG. 12 shows an example of a method for training a diffusion model according to aspects of the present disclosure.
Figure 13:
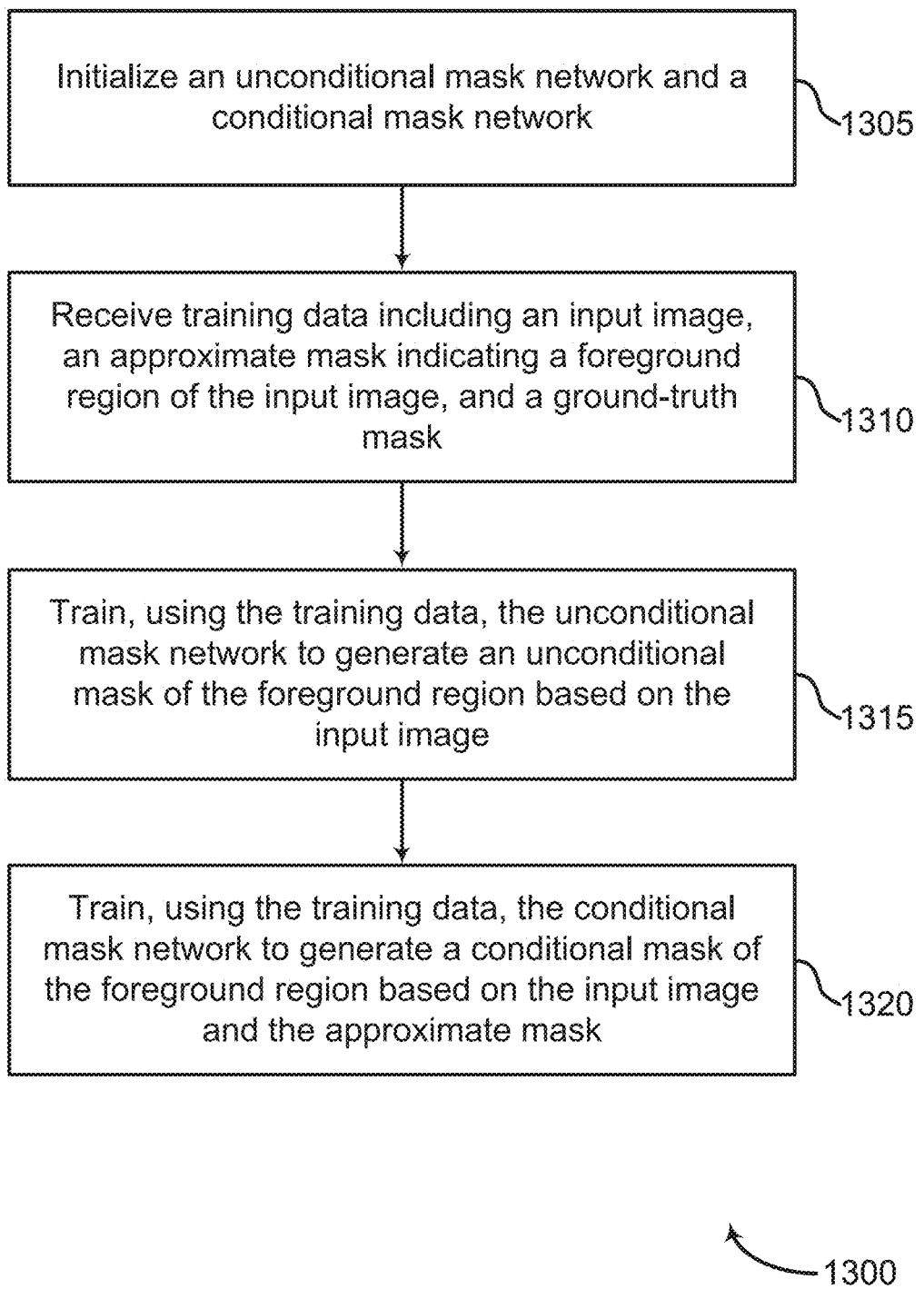
FIG. 13 shows an example of a method for training a machine learning model according to aspects of the present disclosure.

In FIGS. 12-13, a method, apparatus, and non-transitory computer readable medium for image processing are described. One or more embodiments of the method, apparatus, and non-transitory computer readable medium include initializing an unconditional mask network and a conditional mask network; receiving training data including an input image, an approximate mask indicating a foreground region of the input image, and a ground-truth mask; training, using the training data, the unconditional mask network to generate an unconditional mask of the foreground region based on the input image; and training, using the training data, the conditional mask network to generate a conditional mask of the foreground region based on the input image and the approximate mask.

Some examples of the method, apparatus, and non-transitory computer readable medium further include combining the unconditional mask and the conditional mask to obtain a combined mask, where an output image is generated based on the combined mask.

In some examples, the foreground region comprises text based on a font and modified with a text effect, and where the approximate mask is based on the text and the font without the text effect. In some examples, the conditional mask comprises a refined probability mask.

FIG. 12 shows an example of a method 1200 for training a diffusion model via forward and reverse diffusion according to aspects of the present disclosure. The method 1200 represents an example of training a reverse diffusion process as described above with reference to FIG. 11. In some examples, these operations are performed by a system including a processor executing a set of codes to control functional elements of an apparatus, such as the image processing apparatus 700 described in FIG. 7.

Additionally or alternatively, certain processes of method 1200 may be performed using special-purpose hardware. Generally, these operations are performed according to the methods and processes described in accordance with aspects of the present disclosure. In some cases, the operations described herein are composed of various substeps, or are performed in conjunction with other operations.

At operation 1205, the user initializes an untrained model. Initialization can include defining the architecture of the model and establishing initial values for the model parameters. In some cases, the initialization can include defining hyper-parameters such as the number of layers, the resolution and channels of each layer blocks, the location of skip connections, and the like.

At operation 1210, the system adds noise to a training image using a forward diffusion process in N stages. In some cases, the forward diffusion process is a fixed process where Gaussian noise is successively added to an image. In latent diffusion models, the Gaussian noise may be successively added to features in a latent space.

At operation 1215, the system at each stage n, starting with stage N, a reverse diffusion process is used to predict the image or image features at stage n−1. For example, the reverse diffusion process can predict the noise that was added by the forward diffusion process, and the predicted noise can be removed from the image to obtain the predicted image. In some cases, an original image is predicted at each stage of the training process.

At operation 1220, the system compares predicted image (or image features) at stage n−1 to an actual image (or image features), such as the image at stage n−1 or the original input image. For example, given observed data x, the diffusion model may be trained to minimize the variational upper bound of the negative log-likelihood −log $p_\theta(x)$ of the training data.

At operation 1225, the system updates parameters of the model based on the comparison. For example, parameters of a U-Net may be updated using gradient descent. Time-dependent parameters of the Gaussian transitions can also be learned.

FIG. 13 shows an example of a method 1300 for training a machine learning model according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

Supervised learning is one of three basic machine learning paradigms, alongside unsupervised learning and reinforcement learning. Supervised learning is a machine learning technique based on learning a function that maps an input to an output based on example input-output pairs. Supervised learning generates a function for predicting labeled data based on labeled training data consisting of a set of training examples. In some cases, each example is a pair consisting of an input object (typically a vector) and a desired output value (i.e., a single value, or an output vector). A supervised learning algorithm analyzes the training data and produces the inferred function, which can be used for mapping new examples. In some cases, the learning results in a function that correctly determines the class labels for unseen instances. In other words, the learning algorithm generalizes from the training data to unseen examples.

Accordingly, during the training process, the parameters and weights of the machine learning model are adjusted to increase the accuracy of the result (i.e., by attempting to minimize a loss function which corresponds in some way to the difference between the current result and the target result). The weight of an edge increases or decreases the strength of the signal transmitted between nodes. In some cases, nodes have a threshold below which a signal is not transmitted at all. In some examples, the nodes are aggregated into layers. Different layers perform different transformations on their inputs. The initial layer is known as the input layer and the last layer is known as the output layer. In some cases, signals traverse certain layers multiple times.

At operation 1305, the system initializes an unconditional mask network and a conditional mask network. In some cases, the operations of this step refer to, or may be performed by, a training component as described with reference to FIG. 7.

At operation 1310, the system receives training data including an input image, an approximate mask indicating a foreground region of the input image, and a ground-truth mask. In some cases, the operations of this step refer to, or may be performed by, a training component as described with reference to FIG. 7.

At operation 1315, the system trains, using the training data, the unconditional mask network to generate an unconditional mask of the foreground region based on the input image. In some cases, the operations of this step refer to, or may be performed by, a training component as described with reference to FIG. 7. In some embodiments, the unconditional mask network is excluded from receiving an approximate mask.

At operation 1320, the system trains, using the training data, the conditional mask network to generate a conditional mask of the foreground region based on the input image and the approximate mask. In some cases, the operations of this step refer to, or may be performed by, a training component as described with reference to FIG. 7. In some embodiments, the conditional mask network receives an approximate mask indicating a foreground region of the input image.

In some embodiments, the unconditional mask network and the conditional mask network are trained using the training data for background separation tasks. In some examples, a pre-trained image generation model (e.g., a diffusion model) is used to generate the input image. Other types of generative models can also be used to generate the input image.

Figure 14:
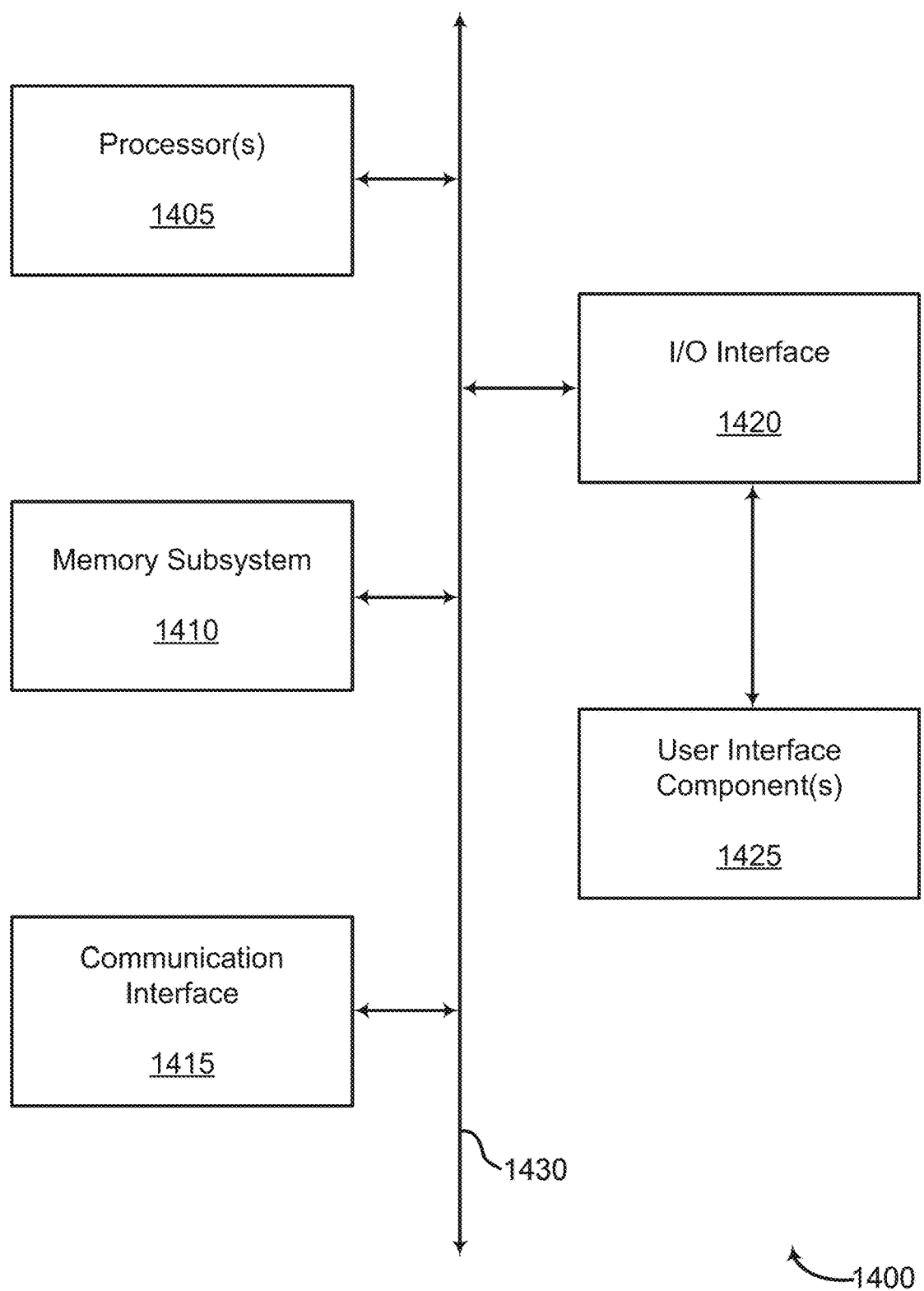
FIG. 14 shows an example of a computing device according to aspects of the present disclosure.

FIG. 14 shows an example of a computing device 1400 according to aspects of the present disclosure. The example shown includes computing device 1400, processor(s) 1405, memory subsystem 1410, communication interface 1415, I/O interface 1420, user interface component(s) 1425, and channel 1430. In one embodiment, computing device 1400 includes processor(s) 1405, memory subsystem 1410, communication interface 1415, I/O interface 1420, user interface component(s) 1425, and channel 1430.

In some embodiments, computing device 1400 is an example of, or includes aspects of, image processing apparatus 110 of FIG. 1. In some embodiments, computing device 1400 includes one or more processors 1405 that can execute instructions stored in memory subsystem 1410 to obtain an input image and an approximate mask that approximately indicates a foreground region of the input image; generate, by an unconditional mask network, an unconditional mask of the foreground region based on the input image; generate, by a conditional mask network, a conditional mask of the foreground region based on the input image and the approximate mask; and generate an output image including the foreground region of the input image based on the unconditional mask and the conditional mask.

According to some embodiments, computing device 1400 includes one or more processors 1405. In some cases, a processor is an intelligent hardware device, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or a combination thereof. In some cases, a processor is configured to operate a memory array using a memory controller. In other cases, a memory controller is integrated into a processor. In some cases, a processor is configured to execute computer-readable instructions stored in a memory to perform various functions. In some embodiments, a processor includes special purpose components for modem processing, baseband processing, digital signal processing, or transmission processing.

According to some embodiments, memory subsystem 1410 includes one or more memory devices. Examples of a memory device include random access memory (RAM), read-only memory (ROM), or a hard disk. Examples of memory devices include solid state memory and a hard disk drive. In some examples, memory is used to store computer-readable, computer-executable software including instructions that, when executed, cause a processor to perform various functions described herein. In some cases, the memory contains, among other things, a basic input/output system (BIOS) which controls basic hardware or software operation such as the interaction with peripheral components or devices. In some cases, a memory controller operates memory cells. For example, the memory controller can include a row decoder, column decoder, or both. In some cases, memory cells within a memory store information in the form of a logical state.

According to some embodiments, communication interface 1415 operates at a boundary between communicating entities (such as computing device 1400, one or more user devices, a cloud, and one or more databases) and channel 1430 and can record and process communications. In some cases, communication interface 1415 is provided to enable a processing system coupled to a transceiver (e.g., a transmitter and/or a receiver). In some examples, the transceiver is configured to transmit (or send) and receive signals for a communications device via an antenna.

According to some embodiments, I/O interface 1420 is controlled by an I/O controller to manage input and output signals for computing device 1400. In some cases, I/O interface 1420 manages peripherals not integrated into computing device 1400. In some cases, I/O interface 1420 represents a physical connection or port to an external peripheral. In some cases, the I/O controller uses an operating system such as iOS®, ANDROID®, MS-DOS®, MS-WINDOWS®, OS/2®, UNIX®, LINUX®, or other known operating system. In some cases, the I/O controller represents or interacts with a modem, a keyboard, a mouse, a touchscreen, or a similar device. In some cases, the I/O controller is implemented as a component of a processor. In some cases, a user interacts with a device via I/O interface 1420 or via hardware components controlled by the I/O controller.

According to some embodiments, user interface component(s) 1425 enable a user to interact with computing device 1400. In some cases, user interface component(s) 1425 include an audio device, such as an external speaker system, an external display device such as a display screen, an input device (e.g., a remote control device interfaced with a user interface directly or through the I/O controller), or a combination thereof. In some cases, user interface component(s) 1425 include a GUI.

Performance of apparatus, systems and methods of the present disclosure have been evaluated, and results indicate embodiments of the present disclosure have obtained increased performance over existing technology. Example experiments demonstrate that the image processing apparatus based on the present disclosure outperforms conventional systems.

The description and drawings described herein represent example configurations and do not represent all the implementations within the scope of the claims. For example, the operations and steps may be rearranged, combined or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein, but is to be accorded the broadest scope consistent with the principles and novel features disclosed herein.

The described methods may be implemented or performed by devices that include a general-purpose processor, a digital signal processor (DSP), an application specific integrated circuit (ASIC), a field programmable gate array (FPGA) or other programmable logic device, discrete gate or transistor logic, discrete hardware components, or any combination thereof. A general-purpose processor may be a microprocessor, a conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be implemented in hardware or software and may be executed by a processor, firmware, or any combination thereof. If implemented in software executed by a processor, the functions may be stored in the form of instructions or code on a computer-readable medium.

Computer-readable media includes both non-transitory computer storage media and communication media including any medium that facilitates transfer of code or data. A non-transitory storage medium may be any available medium that can be accessed by a computer. For example, non-transitory computer-readable media can comprise random access memory (RAM), read-only memory (ROM), electrically erasable programmable read-only memory (EEPROM), compact disk (CD) or other optical disk storage, magnetic disk storage, or any other non-transitory medium for carrying or storing data or code.

Also, connecting components may be properly termed computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

In this disclosure and the following claims, the word "or" indicates an inclusive list such that, for example, the list of X, Y, or Z means X or Y or Z or XY or XZ or YZ or XYZ. Also the phrase "based on" is not used to represent a closed set of conditions. For example, a step that is described as "based on condition A" may be based on both condition A and condition B. In other words, the phrase "based on" shall be construed to mean "based at least in part on." Also, the words "a" or "an" indicate "at least one."

What is claimed is:

1. A method comprising:
obtaining an input image and an approximate mask that approximately indicates a foreground region of the input image;
generating, by an unconditional mask network, an unconditional mask of the foreground region based on the input image;
generating, by a conditional mask network, a conditional mask of the foreground region based on the input image and the approximate mask; and
generating an output image including the foreground region of the input image based on the unconditional mask and the conditional mask.

2. The method of claim 1, wherein generating the output image comprises:
combining the unconditional mask and the conditional mask to obtain a combined mask, wherein the output image is generated based on the combined mask.

3. The method of claim 1, wherein:
the input image is generated based on the approximate mask.

4. The method of claim 1, wherein generating the output image comprises:
computing a distance transformation map based on the approximate mask, wherein the output image is generated based on the distance transformation map.

5. The method of claim 1, wherein generating the output image comprises:
computing a color distance map based on the approximate mask, wherein the output image is generated based on the color distance map.

6. The method of claim 1, wherein generating the output image comprises:
performing island removal on the input image, wherein the output image is generated based on the island removal.

7. The method of claim 1, wherein:
the foreground region comprises text based on a font and modified with a text effect, and wherein the approximate mask is based on the text and the font without the text effect.

8. The method of claim 1, wherein:
the unconditional mask comprises a probability mask and the conditional mask comprises a refined probability mask.

9. The method of claim 1, wherein:
the unconditional mask network is trained to generate the unconditional mask of the foreground region based on the input image and the conditional mask network is trained to generate the conditional mask of the foreground region based on the input image and the approximate mask.

10. A method comprising:
initializing an unconditional mask network and a conditional mask network;
receiving training data including an input image, an approximate mask indicating a foreground region of the input image, and a ground-truth mask;
training, using the training data, the unconditional mask network to generate an unconditional mask of the foreground region based on the input image; and
training, using the training data, the conditional mask network to generate a conditional mask of the foreground region based on the input image and the approximate mask.

11. The method of claim 10, further comprising:
combining the unconditional mask and the conditional mask to obtain a combined mask, wherein an output image is generated based on the combined mask.

12. The method of claim 10, wherein:
the foreground region comprises text based on a font and modified with a text effect, and wherein the approximate mask is based on the text and the font without the text effect.

13. The method of claim 10, wherein:
the conditional mask comprises a refined probability mask.

14. An apparatus comprising:
at least one processor;
at least one memory including instructions executable by the at least one processor;
a user interface comprising parameters stored in the at least one memory and configured to obtain an input image and an approximate mask that approximately indicates a foreground region of the input image;
an unconditional mask network comprising parameters stored in the at least one memory and configured to generate an unconditional mask of the foreground region based on the input image; and a conditional mask network comprising parameters stored in the at least one memory and configured to generate a conditional mask of the foreground region based on the input image and the approximate mask.

15. The apparatus of claim 14, further comprising:

an image generation model configured to generate an output image including the foreground region of the input image based on the unconditional mask and the conditional mask.

16. The apparatus of claim 15, further comprising:

a distance transform component configured to compute a distance transformation map based on the approximate mask, wherein the output image is generated based on the distance transformation map.

17. The apparatus of claim 15, further comprising:

a color distance component configured to compute a color distance map based on the approximate mask, wherein the output image is generated based on the color distance map.

18. The apparatus of claim 15, further comprising:

an island removal component configured to perform island removal on the input image, wherein the output image is generated based on the island removal.

19. The apparatus of claim 15, further comprising:

a mask combination component configured to combine the unconditional mask and the conditional mask to obtain a combined mask, wherein the output image is generated based on the combined mask.

20. The apparatus of claim 14, further comprising:

a text-effect model configured to generate the input image.

* * * * *